United States Patent
Akl et al.

(10) Patent No.: US 12,267,767 B2
(45) Date of Patent: Apr. 1, 2025

(54) CONDITIONAL AUTHORIZATION OF MOBILE NODES

(71) Applicant: QUALCOMM Incorporated, San Diego, CA (US)

(72) Inventors: Naeem Akl, Somerville, NJ (US); Navid Abedini, Basking Ridge, NJ (US); Karl Georg Hampel, Jersey City, NJ (US); Jianghong Luo, Skillman, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 386 days.

(21) Appl. No.: 17/676,007

(22) Filed: Feb. 18, 2022

(65) Prior Publication Data

US 2023/0269656 A1    Aug. 24, 2023

(51) Int. Cl.
*H04W 48/16*    (2009.01)
(52) U.S. Cl.
CPC .................................. *H04W 48/16* (2013.01)
(58) Field of Classification Search
None
See application file for complete search history.

(56) References Cited

U.S. PATENT DOCUMENTS

| | | | | |
|---|---|---|---|---|
| 2015/0215028 A1* | 7/2015 | Ljung | ..................... | H04W 4/06 370/315 |
| 2017/0347338 A1* | 11/2017 | Chen | ..................... | H04W 72/30 |
| 2018/0091964 A1 | 3/2018 | Adachi et al. | | |
| 2019/0208502 A1 | 7/2019 | Du et al. | | |
| 2019/0274017 A1* | 9/2019 | Wang | ................... | H04L 12/1854 |
| 2020/0196225 A1* | 6/2020 | Wang | ..................... | H04W 76/11 |
| 2023/0412250 A1* | 12/2023 | Huang | ................... | H04L 5/0055 |
| 2024/0032129 A1* | 1/2024 | Fujishiro | ............... | H04W 76/19 |
| 2024/0334261 A1* | 10/2024 | Teyeb | ................... | H04W 24/08 |

FOREIGN PATENT DOCUMENTS

WO    WO-2022012426 A1    1/2022

OTHER PUBLICATIONS

International Search Report and Written Opinion—PCT/US2023/062308—ISA/EPO—May 8, 2023.

\* cited by examiner

*Primary Examiner* — Jenkey Van
(74) *Attorney, Agent, or Firm* — Guang Y. Zhang; Holland & Hart LLP

(57) ABSTRACT

Methods, systems, and devices for wireless communications are described. A mobile integrated access and backhaul (IAB) node may transmit, to an IAB supported network, an indication of IAB capability. The mobile IAB node may also indicate to the IAB supported network a mobility status associated with the mobile IAB node. The IAB supported network may conditionally determine authorization for the mobile IAB node based on the mobility status, a subscription status, or both. The IAB supported network may transmit, to the mobile IAB node, instruction to operate in an IAB mode and perform the IAB operation. The mobile IAB node may communicate with one or more devices based on the instruction.

26 Claims, 21 Drawing Sheets

CONDITIONAL AUTHORIZATION OF MOBILE NODES

FIELD OF TECHNOLOGY

The following relates to wireless communications, including conditional authorization of mobile nodes.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support conditional authorization of mobile nodes. Generally, the described techniques provide for a mobile integrated access and backhaul (IAB) node, or other node, to communicate with an IAB supported network and receive authorization for an IAB operation. The techniques enable conditional authorization of the mobile IAB node to perform the IAB operation based on a mobility status of the mobile IAB node. For example, the mobile IAB node may transmit, to the IAB supported network, an indication of IAB capability. The IAB capability may indicate that the mobile IAB node supports IAB operations. The mobile IAB node may also indicate to the IAB supported network a mobility status associated with the mobile IAB node. The IAB supported network may conditionally determine authorization for the mobile IAB node based on the mobility status, a subscription status, or both. The IAB supported network may transmit, to the mobile IAB node, instruction to operate in an IAB mode and perform the IAB operation. In some examples, the mobility status may refer to whether the IAB node is mobile or stationary, a speed of the IAB node (e.g., above or below a threshold), a current or future mobility status, or any combination thereof. The mobility status may also indicate a geographic area where the mobile IAB node may perform the IAB operation or refrain from performing the IAB operation.

A method for wireless communication at a wireless node is described. The method may include transmitting, to a network entity, a first message including an indication of a capability of the wireless node to operate in an IAB mode by supporting communication for one or more child nodes of the wireless node, receiving, from the network entity, a second message in response to the first message, the second message instructing the wireless node to operate in the IAB mode based on the capability of the wireless node and a mobility status of the wireless node, the mobility status associated with a location of the wireless node, a speed of the wireless node, or both, and communicating, by the wireless node operating in the IAB mode, with one or more devices based on the second message.

An apparatus for wireless communication at a wireless node is described. The apparatus may include a memory and a processor coupled to the memory. The processor coupled to the memory may be configured to transmit, to a network entity, a first message including an indication of a capability of the wireless node to operate in an IAB mode by supporting communication for one or more child nodes of the wireless node, receive, from the network entity, a second message in response to the first message, the second message instructing the wireless node to operate in the IAB mode based on the capability of the wireless node and a mobility status of the wireless node, the mobility status associated with a location of the wireless node, a speed of the wireless node, or both, and communicate, by the wireless node operating in the IAB mode, with one or more devices based on the second message.

Another apparatus for wireless communication at a wireless node is described. The apparatus may include means for transmitting, to a network entity, a first message including an indication of a capability of the wireless node to operate in an IAB mode by supporting communication for one or more child nodes of the wireless node, means for receiving, from the network entity, a second message in response to the first message, the second message instructing the wireless node to operate in the IAB mode based on the capability of the wireless node and a mobility status of the wireless node, the mobility status associated with a location of the wireless node, a speed of the wireless node, or both, and means for communicating, by the wireless node operating in the IAB mode, with one or more devices based on the second message.

A non-transitory computer-readable medium storing code for wireless communication at a wireless node is described. The code may include instructions executable by a processor to transmit, to a network entity, a first message including an indication of a capability of the wireless node to operate in an IAB mode by supporting communication for one or more child nodes of the wireless node, receive, from the network entity, a second message in response to the first message, the second message instructing the wireless node to operate in the IAB mode based on the capability of the wireless node and a mobility status of the wireless node, the mobility status associated with a location of the wireless node, a speed of the wireless node, or both, and communicate, by the wireless node operating in the IAB mode, with one or more devices based on the second message.

Some examples of the method, apparatuses, and non-transitory computer-readable medium described herein may further include operations, features, means, or instructions for transmitting, to the network entity, a third message indicating the mobility status of the wireless node based on the capability of the wireless node to operate in the IAB mode.

In some examples of the method, apparatuses, and non-transitory computer-readable medium described herein, transmitting the first message may include operations, features, means, or instructions for transmitting the mobility status of the wireless node to the network entity in the first message.

Some examples of the method, apparatuses, and non-transitory computer-readable medium described herein may further include operations, features, means, or instructions for determining the mobility status of the wireless node, where the mobility status may be one of stationary or mobile and transmitting the mobility status to the network entity.

Some examples of the method, apparatuses, and non-transitory computer-readable medium described herein may further include operations, features, means, or instructions for transmitting the mobility status to the network entity, where the mobility status may be based on the speed of the wireless node relative to a speed threshold.

Some examples of the method, apparatuses, and non-transitory computer-readable medium described herein may further include operations, features, means, or instructions for receiving an indication of the speed threshold from the network entity.

In some examples of the method, apparatuses, and non-transitory computer-readable medium described herein, the mobility status indicates the speed of the wireless node relative to the speed threshold.

Some examples of the method, apparatuses, and non-transitory computer-readable medium described herein may further include operations, features, means, or instructions for transmitting a broadcast message indicating the wireless node operating in the IAB mode based on the second message, where the broadcast message includes a system information block (SIB).

In some examples of the method, apparatuses, and non-transitory computer-readable medium described herein, receiving the second message may include operations, features, means, or instructions for receiving an indication of an area for the wireless node to operate in the IAB mode in the second message.

In some examples of the method, apparatuses, and non-transitory computer-readable medium described herein, communicating with the one or more devices may include operations, features, means, or instructions for communicating, by the wireless node operating in the IAB mode, with the one or more devices in the area for the wireless node to operate in the IAB mode.

In some examples of the method, apparatuses, and non-transitory computer-readable medium described herein, the area includes a cell, a radio access network based notification area code, a tracking area, a portion of a cell, a geographical area, or any combination thereof.

In some examples of the method, apparatuses, and non-transitory computer-readable medium described herein, communicating with the one or more devices may include operations, features, means, or instructions for communicating, by the wireless node operating in the IAB mode, with a child wireless node of the wireless node.

Some examples of the method, apparatuses, and non-transitory computer-readable medium described herein may further include operations, features, means, or instructions for operating in the IAB mode may be based on an F1 connection associated with the wireless node.

In some examples of the method, apparatuses, and non-transitory computer-readable medium described herein, the first message, the second message, or both may be communicated using one of a non-access stratum, a radio resource control (RRC) message, a network interface, or any combination thereof.

A method for wireless communication at a network entity is described. The method may include receiving, from a wireless node, a first message including an indication of a capability of the wireless node to operate in an IAB mode by supporting communication for one or more child nodes of the wireless node, transmitting, to a core network entity, a second message in response to the first message, the second message including the indication of the capability of the wireless node to operate in the IAB mode, receiving, from the core network entity, a third message in response to the second message, the third message instructing the wireless node whether to operate in the IAB mode based on the capability of the wireless node and a mobility status of the wireless node, the mobility status associated with a location of the wireless node, a speed of the wireless node, or both, and transmitting, to the wireless node, a fourth message in response to the third message, the fourth message instructing the wireless node whether to operate in the IAB mode.

An apparatus for wireless communication at a network entity is described. The apparatus may include a memory and a processor coupled to the memory. The processor coupled to the memory may be configured to receive, from a wireless node, a first message including an indication of a capability of the wireless node to operate in an IAB mode by supporting communication for one or more child nodes of the wireless node, transmit, to a core network entity, a second message in response to the first message, the second message including the indication of the capability of the wireless node to operate in the IAB mode, receive, from the core network entity, a third message in response to the second message, the third message instructing the wireless node whether to operate in the IAB mode based on the capability of the wireless node and a mobility status of the wireless node, the mobility status associated with a location of the wireless node, a speed of the wireless node, or both, and transmit, to the wireless node, a fourth message in response to the third message, the fourth message instructing the wireless node whether to operate in the IAB mode.

Another apparatus for wireless communication at a network entity is described. The apparatus may include means for receiving, from a wireless node, a first message including an indication of a capability of the wireless node to operate in an IAB mode by supporting communication for one or more child nodes of the wireless node, means for transmitting, to a core network entity, a second message in response to the first message, the second message including the indication of the capability of the wireless node to operate in the IAB mode, means for receiving, from the core network entity, a third message in response to the second message, the third message instructing the wireless node whether to operate in the IAB mode based on the capability of the wireless node and a mobility status of the wireless node, the mobility status associated with a location of the wireless node, a speed of the wireless node, or both, and means for transmitting, to the wireless node, a fourth message in response to the third message, the fourth message instructing the wireless node whether to operate in the IAB mode.

A non-transitory computer-readable medium storing code for wireless communication at a network entity is described. The code may include instructions executable by a processor to receive, from a wireless node, a first message including an indication of a capability of the wireless node to operate in an IAB mode by supporting communication for one or more child nodes of the wireless node, transmit, to a core network entity, a second message in response to the first message, the second message including the indication of the capability of the wireless node to operate in the IAB mode, receive, from the core network entity, a third message in response to the second message, the third message instructing the wireless node whether to operate in the IAB mode based on the capability of the wireless node and a mobility status of the wireless node, the mobility status associated with a location of the wireless node, a speed of the wireless node, or both, and transmit, to the wireless node, a fourth message in response to the third message, the fourth message instructing the wireless node whether to operate in the IAB mode.

Some examples of the method, apparatuses, and non-transitory computer-readable medium described herein may further include operations, features, means, or instructions for communicating with a child wireless node of the wireless node based on instructing the wireless node to operate in the IAB mode.

Some examples of the method, apparatuses, and non-transitory computer-readable medium described herein may further include operations, features, means, or instructions for receiving, from the wireless node, a fifth message indicating the mobility status of the wireless node based on the capability of the wireless node to operate in the IAB mode.

In some examples of the method, apparatuses, and non-transitory computer-readable medium described herein, receiving the first message may include operations, features, means, or instructions for receiving the mobility status of the wireless node from the wireless node in the first message.

In some examples of the method, apparatuses, and non-transitory computer-readable medium described herein, transmitting the fourth message may include operations, features, means, or instructions for transmitting the fourth message to a second wireless node based on a handover procedure and the third message, the fourth message instructing the second wireless node to communicate with a child wireless node of the wireless node.

Some examples of the method, apparatuses, and non-transitory computer-readable medium described herein may further include operations, features, means, or instructions for transmitting, to the wireless node, a fifth message in response to the third message, the fifth message associated with a network interface connection.

Some examples of the method, apparatuses, and non-transitory computer-readable medium described herein may further include operations, features, means, or instructions for transmitting a fifth message in response to the third message, the fifth message associated with activation of one or more cells of the wireless node.

Some examples of the method, apparatuses, and non-transitory computer-readable medium described herein may further include operations, features, means, or instructions for transmitting a fifth message in response to the third message, the fifth message associated with configuring resources of the wireless node.

A method for wireless communication at a core network entity is described. The method may include receiving, from a network entity, a first message including an indication of a capability of a wireless node to operate in an IAB mode by supporting communications with one or more child nodes of the wireless node, determining whether to authorize the wireless node to operate in the IAB mode based on the capability of the wireless node and a mobility status of the wireless node, the mobility status associated with a location of the wireless node, a speed of the wireless node, or both, and transmitting a second message in response to the first message, the second message instructing the wireless node whether to operate in the IAB mode based on the determining.

An apparatus for wireless communication at a core network entity is described. The apparatus may include a memory and a processor coupled to the memory. The processor coupled to the memory may be configured to receive, from a network entity, a first message including an indication of a capability of a wireless node to operate in an IAB mode by supporting communications with one or more child nodes of the wireless node, determine whether to authorize the wireless node to operate in the IAB mode based on the capability of the wireless node and a mobility status of the wireless node, the mobility status associated with a location of the wireless node, a speed of the wireless node, or both, and transmit a second message in response to the first message, the second message instructing the wireless node whether to operate in the IAB mode based on the determining.

Another apparatus for wireless communication at a core network entity is described. The apparatus may include means for receiving, from a network entity, a first message including an indication of a capability of a wireless node to operate in an IAB mode by supporting communications with one or more child nodes of the wireless node, means for determining whether to authorize the wireless node to operate in the IAB mode based on the capability of the wireless node and a mobility status of the wireless node, the mobility status associated with a location of the wireless node, a speed of the wireless node, or both, and means for transmitting a second message in response to the first message, the second message instructing the wireless node whether to operate in the IAB mode based on the determining.

A non-transitory computer-readable medium storing code for wireless communication at a core network entity is described. The code may include instructions executable by a processor to receive, from a network entity, a first message including an indication of a capability of a wireless node to operate in an IAB mode by supporting communications with one or more child nodes of the wireless node, determine whether to authorize the wireless node to operate in the IAB mode based on the capability of the wireless node and a mobility status of the wireless node, the mobility status associated with a location of the wireless node, a speed of the wireless node, or both, and transmit a second message in response to the first message, the second message instructing the wireless node whether to operate in the IAB mode based on the determining.

Some examples of the method, apparatuses, and non-transitory computer-readable medium described herein may further include operations, features, means, or instructions for receiving, from the network entity, a third message indicating the mobility status of the wireless node based on the capability of the wireless node to operate in the IAB mode.

In some examples of the method, apparatuses, and non-transitory computer-readable medium described herein, receiving the first message may include operations, features, means, or instructions for receiving the mobility status of the wireless node from the network entity in the first message.

Some examples of the method, apparatuses, and non-transitory computer-readable medium described herein may further include operations, features, means, or instructions for transmitting the second message includes transmitting the second message to the wireless node, the network entity, or both.

DETAILED DESCRIPTION

Figure 1:
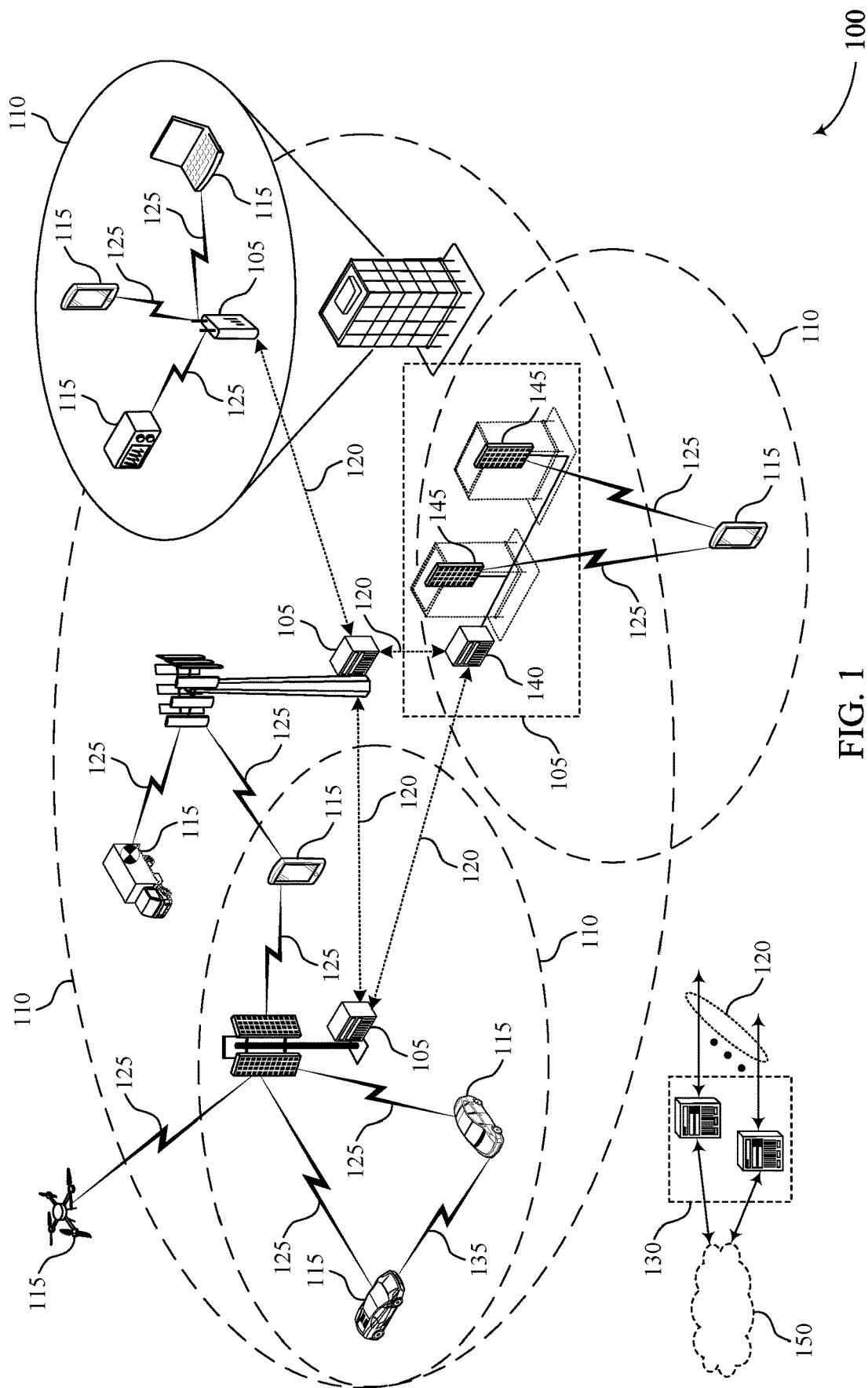
FIG. 1 illustrates an example of a wireless communications system that supports conditional authorization of mobile nodes, such as integrated access and backhaul (IAB) nodes, in accordance with aspects of the present disclosure.

In some wireless communications systems, wireless backhaul connections may serve as relays, and connect network entities to a core network via one or more other network entities. The use of wireless backhaul connections instead of wireline backhaul links (e.g., used in some other wireless communications systems) may reduce a cost associated with the deployment of fiber connections for wireline backhaul links. In some cases, a wireless network that implements wireless connections (e.g., backhaul connections) between network entities may be referred to as an integrated access and backhaul (IAB) network. Some IAB networks may support mobile IAB nodes. For example, a mobile IAB node may change location (e.g., in a moving vehicle) and may serve surrounding communication devices as part of an IAB operation. To perform the IAB operation, an IAB node may connect to an IAB supported network and receive authorization for the IAB operation as part of the connection procedure. However, existing (legacy) techniques do not support a procedure for the mobile IAB node to receive authorization (e.g., activation/deactivation) for the IAB operation, particularly when a mobile IAB node is moving above a speed threshold or operating in a region in which IAB for the mobile IAB node is not supported (e.g., due to other IAB nodes in the area or lack of IAB network support). Due to the lack of support for mobile IAB nodes, the mobile IAB nodes may not receive authorization, efficiently connect to the IAB network, and may experience drawbacks (e.g., lack of flexibility for mobile operations, inefficient use of resources, higher power consumption).

The techniques described herein provide procedures for a mobile IAB node to communicate with an IAB supported network and receive authorization for an IAB operation. The techniques enable a core network entity to determine whether the mobile IAB node is authorized to perform the IAB operation based on a mobility status associated with the mobile IAB node. For example, the mobile IAB node may transmit, to an IAB supported network, an indication of IAB capability. The mobile IAB node may also indicate to the IAB supported network a mobility status associated with the mobile IAB node. The IAB supported network may conditionally determine authorization for the mobile IAB node based on the mobility status, a subscription status, or both. The IAB supported network may transmit, to the mobile IAB node, instruction to operate in an IAB mode and perform the IAB operation. In some examples, the mobility status may refer to whether the IAB node is mobile or stationary, a speed (e.g., above or below a threshold), a current mobility status, a future mobility status, or any combination thereof. The mobility status may also indicate a geographic area where the mobile IAB node may perform the IAB operation or refrain from performing the IAB operation.

Aspects of the disclosure are initially described in the context of wireless communications systems. Aspects of the disclosure are then described with respect to subsystem diagrams and a process flow. Aspects of the disclosure are further illustrated by and described with reference to apparatus diagrams, system diagrams, and flowcharts that relate to conditional authorization of mobile nodes.

FIG. 1 illustrates an example of a wireless communications system 100 that supports conditional authorization of mobile nodes in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, IAB nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, the wireless communications system 100 may be an example of a network, for example a wireless backhaul communications network, such as an IAB network, among other various examples. An IAB network may include an IAB donor (or "anchor") node and one or more relay (or "intermediate") nodes downstream from the donor node. An IAB network may share resources between access and backhaul links such that access traffic may be relayed on a wireless backhaul link. In some cases, the same technology and techniques may be used for access links and backhaul links. IAB donor nodes may provide access to child UEs and the wireless backhaul functionality to IAB nodes. An IAB donor may include a centralized unit (CU) for control of the IAB-network and one or more DUs for scheduling IAB nodes. An IAB donor may have a wireline connection to the core network 130. Downstream from the IAB donor node the network may include one or more IAB nodes (also referred to as one or more of parent nodes, relay nodes, intermediate nodes, or child nodes, depending upon where the node is within the IAB network) within the IAB network, with each wirelessly relaying traffic of one or more other nodes, such as its child nodes (e.g., UEs, or other IAB nodes), to one or more other nodes, such as the parent node (e.g., IAB donor, or IAB node). A UE 115 may connect wirelessly to an IAB donor node that is within range of the UE 115. In some cases, a base station 105 may be an example of a donor IAB node.

In some examples, an IAB node may be a mobile IAB node that is capable of moving from one location to another throughout a network and serving surrounding communication devices (e.g., child UEs) as part of an IAB operation. For example, the mobile IAB node may be a part of a moving cell site. A moving vehicle (e.g., a bus, a taxi, etc.) may include the mobile IAB node and move randomly over a relatively large distance. The mobile IAB node may move at a frequently changing speed (e.g., an urban city speed) and support serving surrounding child UEs (e.g., inside the vehicle, outside the vehicle, or both) in an area (e.g., an urban area). The child UEs may also move at frequently changing speeds that may be random to the mobile IAB node because the child UEs may move independently of the mobile IAB node. In some cases, the child UEs may have limited (e.g., zero or minimal) relative mobility in relation to the mobile IAB node.

In some examples, the mobile IAB node may be a part of a train (e.g., a high-speed train). For example, the mobile IAB node may be affixed to the train (e.g., on top of the train, inside of the train, etc.) and serve child UEs associated with the train. The child UEs may be related to pedestrians riding the train, near the train, entering or leaving the train, or any combination thereof, among other examples. In some examples, the mobile IAB node may move predictably by the IAB network. The mobile IAB node may move at a high speed and over a large distance as part of a known path of the train. In some cases, the child UEs may be passengers on the train and move jointly with the mobile IAB node.

In some examples, the mobile IAB node may be a part of a platoon of vehicles. For example, the mobile IAB node may be affixed to a vehicle (e.g., a command vehicle) of the platoon of vehicles (e.g., on top of the vehicle, inside of the vehicle, etc.) and serve other vehicles of the platoon of vehicles. The command vehicle may connect to the IAB network through the mobile IAB node, while the other vehicles may hold child UEs. In this example, the mobile IAB node may move with a local predictability, such that the IAB network may be able to approximate a path or an area of operation of the mobile IAB node. The mobile IAB node may move at a speed (e.g., a highway speed) and over a distance (e.g., a relatively large distance) while servicing the other vehicles. As the other vehicles and the command vehicle are part of the same platoon of vehicles, the child UEs and the mobile IAB node move jointly.

In some cases, to perform the IAB operation, an IAB node may connect to the IAB network through an IAB donor node. The IAB network (e.g., a next generation core (NGC) device, an AMF, etc.) may transmit a message indicating to the IAB donor node that it is an IAB supported network. The donor node may transmit a second message (e.g., a system information block type one (SIB1) message) to the IAB node with the indication. The IAB node and the IAB donor node may perform a setup procedure (e.g., an RRC setup procedure) and transmit, to the IAB network, a request for authorization to perform the IAB operation including an indication of the IAB node. The IAB network may determine whether the IAB node is authorized based on a subscription of the IAB node. The decision of authorization by the IAB network is Boolean based (e.g., a yes or a no). The IAB network may transmit to the IAB donor node the decision, and the IAB donor node may relay the decision to the IAB node. However, this procedure does not support a procedure for a mobile IAB node to receive conditional authorization (e.g., activation or deactivation dependent upon a parameter) for the IAB operation, particularly when a mobile IAB node is moving above a speed threshold or operating in a region in which IAB for the mobile IAB node is not supported (e.g., due to other IAB nodes in the area or lack of IAB network support). Due to the lack of support for mobile IAB nodes, the mobile IAB nodes may not receive authorization, efficiently connect to the IAB network, and may experience drawbacks (e.g., lack of flexibility for mobile operations, inefficient use of resources, higher power consumption).

The techniques described herein provide procedures for a mobile IAB node to communicate with an IAB supported network and receive authorization for an IAB operation. The techniques enable the core network 130 to determine whether the mobile IAB node is authorized to perform the IAB operation based on a mobility status associated with the mobile IAB node. For example, the mobile IAB node may transmit, to an IAB network, an indication of IAB capability. The mobile IAB node may also indicate to the IAB network a mobility status associated with the mobile IAB node. The IAB network may conditionally determine authorization for the mobile IAB node based on the mobility status, a subscription status, or both. The IAB network may transmit, to the mobile IAB node, instruction to operate in an IAB mode and perform the IAB operation. In some examples, the mobility status may refer to whether the IAB node is mobile or stationary, a speed (e.g., above or below a threshold), a current mobility status, a future mobility status, or any combination thereof. The mobility status may also indicate a geographic area where the mobile IAB node may perform the IAB operation or refrain from performing the IAB operation.

Although some aspects of the present disclosure are described with reference to an IAB network and related devices, units, or nodes, the techniques, processes, operations, methods, and apparatuses described herein are more broadly applicable to various networks, devices, units, and nodes in various wireless communication environments and the present disclosure should not be interpreted as limiting unless specifically noted.

Figure 2:
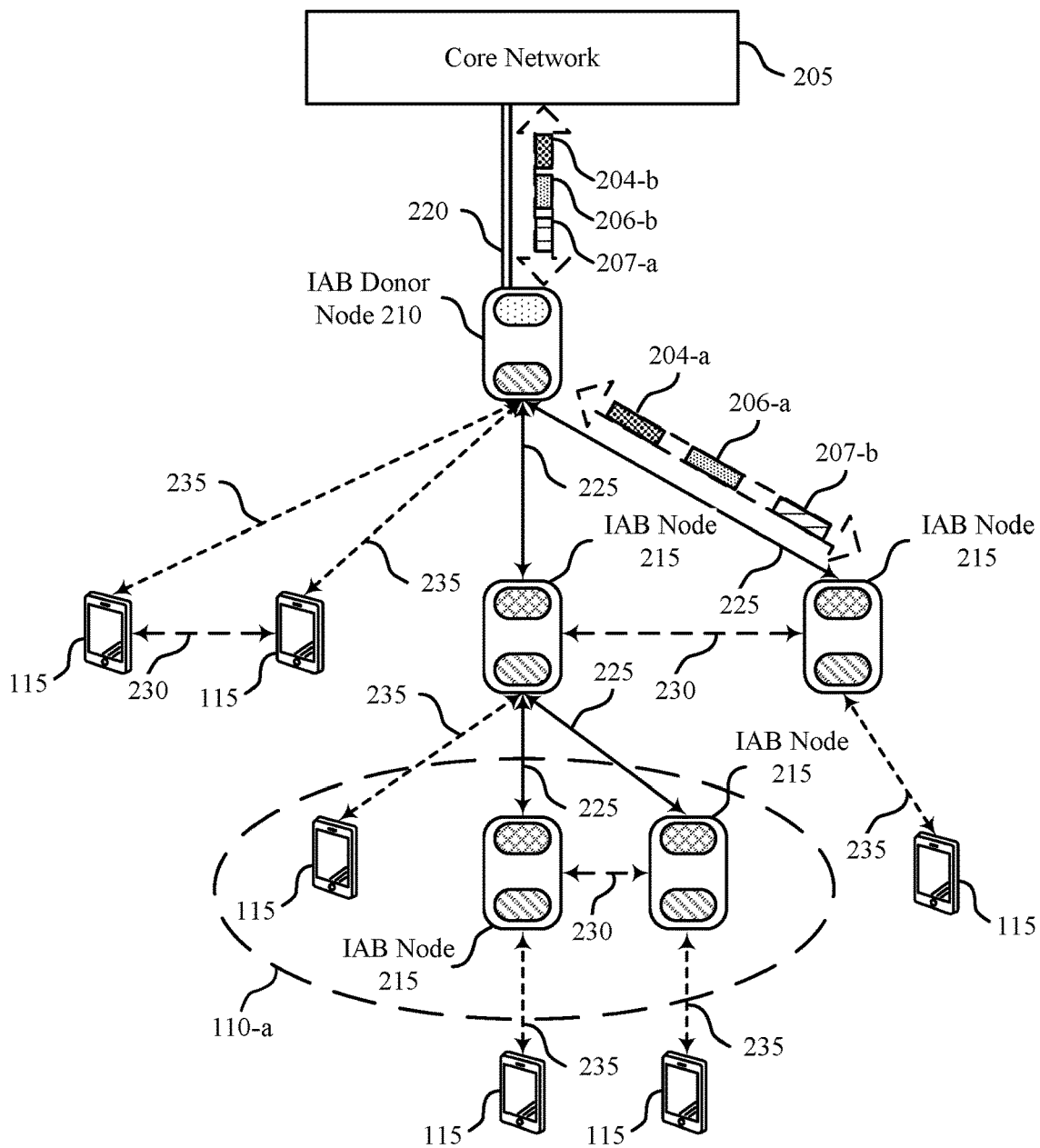
FIG. 2 illustrates an example of an IAB network that supports conditional authorization of mobile nodes in accordance with aspects of the present disclosure.

FIG. 2 illustrates an example of an IAB network 200 that supports conditional authorization of mobile nodes in accordance with aspects of the present disclosure. In some examples, the IAB network 200 may implement aspects of the wireless communications system 100. The IAB network 200 may be a 5G NR system, such as an mmW system, and may supplement wireline backhaul connections, such as a wireline backhaul link 220, by sharing infrastructure and spectral resources for network access among devices that support wireless backhaul capabilities, providing an IAB network architecture.

For example, the IAB network 200 illustrates an IAB network architecture including a core network 205, an IAB donor node 210, a number of IAB nodes 215—which may be examples of IAB relay nodes—and a number of UEs 115. The IAB network 200 may support an overlay of access networks and backhaul networks between access nodes to enable communications between a UE 115 and the core network 205 via one or more wireless or wireline links. Such access networks may include communications between an access node, such as the IAB donor node 210 or an IAB node 215, and a UE 115 and such backhaul networks may include communications between different access nodes. In some cases, communications towards a UE 115 may be referred to as downstream communications and communications towards the core network 205 may be referred to as upstream communications. The IAB network 200 may additionally support sidelink communications between UEs via one or more sidelinks 230 and sidelink communications between IAB nodes 215 via one or more sidelinks 230.

The IAB network 200 may include one or more IAB donor nodes 210 that may function as an interface between a wireline network and a wireless network. For example, the IAB donor node 210 may include at least one wireline backhaul link 220 over which the IAB donor node 210 may communicate with the core network 205 and one or more wireless links, such as wireless backhaul links 225 or access links 235, over which the IAB donor node 210 may communicate with UEs 115 or IAB nodes 215 (e.g., child nodes). In some cases, the IAB donor node 210 may be referred to as an anchor node as a result of the wireline backhaul link 220 between the IAB donor node 210 and the core network 205. The IAB donor node 210 may be split into or otherwise function in two wireless roles or as two entities. For example, the IAB donor node 210 may be split into or otherwise function in a CU role and a distributed unit (DU) role, where the DU associated with the IAB donor node 210 may be at least partially controlled by the associated CU of the IAB donor node 210. In some cases, the CU role and the DU role of the IAB donor node 210 may be different entities. In some other cases, the CU role and the DU role of the IAB donor node 210 may be included within the same entity, but may functionally operate as two different entities (e.g., the IAB donor node 210 may use different software if communicating via the CU role than if communicating via the DU role).

The CU of the IAB donor node 210 may support layer 3 (L3) functionality and signaling, such as RRC or packet data convergence protocol (PDCP) layer functions, and, in some cases, the IAB donor node 210 may control the IAB network through configuration signaling via the CU role. The DU of the IAB donor node 210 may perform lower layer operations, such as layer 1 (L1) or layer 2 (L2) functionality and signaling. For example, the DU of the IAB donor node 210 may perform RLC, MAC, or physical layer functions. In some cases, the IAB donor node 210, via the DU role, may control both the access links 235 and the wireless backhaul links 225 within an IAB network coverage area and may provide control information and scheduling information for descendent (e.g., child) IAB nodes 215 or UEs 115, or both. For example, the IAB donor node 210, via the DU role, may support an RLC channel connection with a UE 115 (via an access link 235) or with an IAB node 215 (via a wireless backhaul link 225).

The IAB nodes 215 also may be split into or otherwise function in two wireless roles or as two entities. For example, an IAB node 215 may be split into or otherwise function in a mobile termination (MT) role and a DU role, where the MT role of the IAB node 215 may be at least partially controlled or scheduled by parent nodes, such as a parent IAB node 215 or the IAB donor node 210. In some cases, the MT role and the DU role of the IAB node 215 may be different entities. In some other cases, the MT role and the DU role of the IAB node 215 may be included within the same entity, but may functionally operate as two different entities (e.g., the IAB node 215 may use different software if communicating via the MT role than if communicating via the DU role). In some cases, the MT role of the IAB node 215 may be similar to a role performed by the UEs 115 within the IAB network 200. Additionally, in some cases, the IAB node 215 may not be directly connected to a wireline backhaul link 220. Instead, the IAB node 215 may connect to the core network 205 via other IAB nodes 215 (e.g., any number of additional IAB nodes 215 and the IAB donor node 210) using wireless backhaul links 225. As such, in examples in which the IAB node 215 functions as a relay node, the IAB node 215 may relay traffic to or from the IAB donor node 210 through one or multiple hops, where a quantity of the one or multiple hops may refer to the number of wireless backhaul links 225 connecting the IAB node 215 to the IAB donor node 210.

The DU of the IAB node 215 may be at least partially controlled by signaling messages from the CU of the IAB donor node 210 (e.g., an associated IAB donor node 210). In some cases, such signaling messages may be transmitted from the IAB donor node 210 to the IAB node 215 via an F1-application protocol (F1-AP) message. In some cases, an IAB donor node 210 may transmit one or more F1-AP messages over an F1 interface. Additionally, the DU role of the IAB node 215 may support a geographic coverage area 110-a of the IAB network coverage area and may provide scheduling information to the UEs 115 and the child IAB nodes 215 within the geographic coverage area 110-a. For example, the DU role of the IAB node 215 may perform the same or similar functions as the DU role of the IAB donor node 210 by controlling or scheduling communication over the access links 235 between the IAB node 215 and the UEs 115 within the geographic coverage area 110-a and the wireless backhaul links 225 between the IAB node 215 and the downstream IAB nodes 215 within the geographic coverage area 110-a. As described herein, the IAB node 215 may communicate upstream (e.g., towards the core network 205) in the IAB network 200 using the MT role of the IAB node 215 and may communicate downstream (e.g., towards a UE 115) in the IAB network 200 using the DU role of the IAB node 215.

In some examples, an IAB node 215 may be a mobile IAB node 215 (or other type of IAB node) that is capable of moving, for example, from one location to another and serving surrounding communication devices (e.g., child UEs) as part of an IAB operation. The IAB network 200 may implement procedures for the mobile IAB node 215 to communicate with the core network 205 (e.g., an AMF) and receive conditional authorization for the IAB operation. For example, the mobile IAB node 215 may connect to the IAB network 200 and transmit, to an IAB donor node 210, a first message 204-a indicating IAB capability. The mobile IAB node 215 may also transmit, to the IAB donor node 210, a second message 206-a indicating a mobility status associated with the mobile IAB node 215. The IAB donor node 210 may transmit to the core network 205 a third message 204-b indicating the IAB capability based on receiving the first message 204-a. The IAB donor node 210 may also transmit to the core network 205 a fourth message 206-b indicating the mobility status based on receiving the second message 206-a. In some cases, the first message 204-a and the second message 206-a may be included in a first same message. Additionally, the third message 204-b and the fourth message 206-b may be included in a second same message.

The core network 205 may conditionally determine authorization for the mobile IAB node 215 based on the mobility status, a subscription status, or both. The core network 205 may transmit, to the IAB donor node 210, a fifth message 207-a indicating that the mobile IAB node 215 is authorized for IAB operation and instructing the mobile IAB node 215 to operate in an IAB mode and perform the IAB operation based on the mobility status of the mobile IAB node 215. In some cases, the fifth message 207-a may be a part of a non-access stratum (NAS) message or an NG application protocol message (NGAP). The IAB donor node 210 may transmit (e.g., forward) a sixth message 207-b, to the mobile IAB node 215, instructing the mobile IAB node 215 to operate in an IAB mode and perform the IAB operation. In some cases, the mobile IAB node 215 may skip the IAB donor node 210 and transmit and receive the messages 204-a, 206-a, and 207-b to and from the core network 205. In some cases, the messages 204-a, 206-a, 204-b, 206-b, 207-a, and 207-b may be exchanged on a non-access stratum (NAS) message, an RRC message, an F1 message, or any combination thereof.

In some examples, the mobility status may refer to whether the mobile IAB node 215 is mobile or stationary, a speed (e.g., above or below a threshold speed), a current mobility status, a future mobility status, the mobility status associated with a location of the mobile IAB node 215, or any combination thereof. The mobility status may also indicate an area where the mobile IAB node 215 may perform the IAB operation or refrain from performing the IAB operation. In some cases, the area may refer to a cell (e.g., a cell of a serving parent), a tracking area, a cell portion, a geographical area, a radio access network (RAN) based notification area code (RANAC), or any combination thereof. In some cases, the core network 205, the IAB donor node 210, or both, may infer the mobility status of the mobile IAB node 215. In such cases, the mobile IAB node 215 may refrain from transmitting the second message 206-*a* and the fourth message 206-*b*.

Although some aspects of the present disclosure are described with reference to an IAB network and related devices, units, or nodes, the techniques, processes, operations, methods, and apparatuses described herein are more broadly applicable to various networks, devices, units and nodes in various wireless communication environments and the present disclosure should not be interpreted as limiting unless specifically noted.

Figure 3:
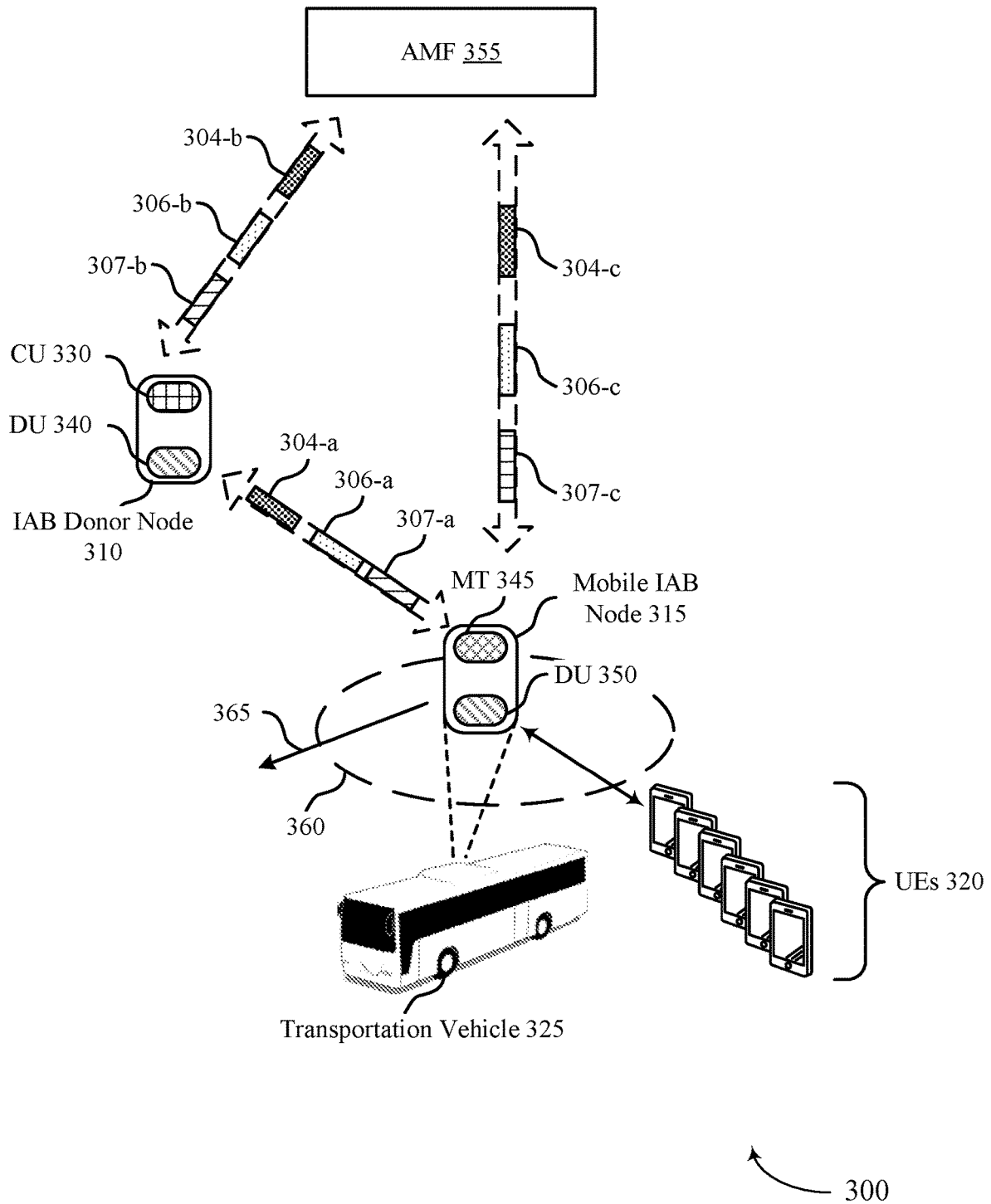
FIG. 3 illustrates an example of an IAB network that supports conditional authorization of mobile nodes in accordance with aspects of the present disclosure.

FIG. 3 illustrates an example of an IAB network 300 that supports conditional authorization of mobile nodes in accordance with aspects of the present disclosure. In some examples, the IAB network 300 may implement aspects of the wireless communications system 100 and the IAB network 200. The IAB network 300 may be a 5G NR system, such as an mmW system. The IAB network 300 may include an IAB donor node 310, a mobile IAB node 315, and an AMF 355. The IAB donor node 310 may include a respective CU 330 and DU 340, which may be examples of CU functionality and DU functionality, respectively, described with reference to FIG. 2. The IAB node 315 may include MT 345 and DU 350, which may be examples of MT functionality and DU functionality, respectively, described with reference to FIG. 2. The AMF 355 may be an example of a core network as described with reference to FIG. 2.

In some examples, the mobile IAB node 315 may connect to the IAB network 300. For example, the mobile IAB node 315 may connect to the IAB network 300 and transmit, to the IAB donor node 310, a first message 304-*a* indicating IAB capability. The mobile IAB node 315 may also transmit, to the IAB donor node 310, a second message 306-*a* indicating a mobility status associated with the mobile IAB node 315. The IAB donor node 310 may transmit to the AMF 355 a third message 304-*b* indicating the IAB capability based on receiving the first message 304-*a*. The IAB donor node 310 may also transmit to the AMF 355 a fourth message 306-*b* indicating the mobility status based on receiving the second message 306-*a*. In some cases, the mobile IAB node 315 may connect to the AMF 355. For example, the mobile IAB node 315 may transmit, to the AMF 355, a fifth message 304-*c* indicating IAB capability and a sixth message 306-*c* indicating a mobility status associated with the mobile IAB node 315. In some examples, the first message 304-*a* and the second message 306-*a* may be included in a first same message, the third message 304-*b* and the fourth message 306-*b* may be included in a second same message, and the fifth message 304-*c* and the sixth message 306-*c* may be included in a third same message.

In some cases, the mobility status may refer to whether the mobile IAB node 315 is mobile or stationary, a speed (e.g., above or below a threshold speed), a current mobility status, a future mobility status, or any combination thereof. For example, a transportation vehicle 325 (e.g., a bus, taxi, train, platoon vehicle, etc.) may include the mobile IAB node 315, as explained in more detail with reference to FIG. 1. Because the transportation vehicle 325 may be mobile, the mobile IAB node 315 may move in a direction 365 at a certain speed (e.g., variable speed, high speed, urban city speed, etc.) within an area 360. The mobile IAB node 315 may also stop moving or be stationary (e.g., at a stop light, arrived at a destination, etc.). In some cases, the mobile IAB node 315 may be traveling on a known route. Because the route is known, the mobile IAB node 315 may project that it will be mobile, a speed, or both, at a future time. In some cases, the mobile IAB node 315 may compute the future mobility status, for example, based on past mobility statuses. The mobile node 315 may determine the future mobility status using these or another method.

In some examples, the AMF 355 may conditionally determine authorization for the mobile IAB node 315 to perform an IAB operation based on the mobility status, a subscription status, or both. For example, the AMF 355 may have conditions to be met for authorization. The conditions may include a type of subscription, a lack of IAB support, a congestion of the IAB network 300, a speed threshold, a current or future mobility status, the mobility status associated with a location of the mobile IAB node 315, among others. In some cases, the mobile IAB node 315 may meet some or all of the conditions based on the mobility status and the subscription status of the mobile IAB node 315 and the AMF 355 may determine that the mobile IAB node 315 is authorized. In some cases, the mobile IAB node 315 may meet some or none of the conditions based on the mobility status and the subscription status of the mobile IAB node 315, and the AMF 355 may determine that the mobile IAB node 315 is unauthorized.

In some cases, the AMF 355 may transmit, to the IAB donor node 310, a seventh message 307-*a* indicating that the mobile IAB node 315 is authorized for the IAB operation and instructing the mobile IAB node 315 to operate in an IAB mode and perform the IAB operation based on the mobility status of the mobile IAB node 315. The IAB donor node 310 may transmit (e.g., forward) an eighth message 307-*b*, to the mobile IAB node 315, instructing the mobile IAB node 315 to operate in the IAB mode and perform the IAB operation. In some cases, where the mobile IAB node 315 connects to the AMF 355, the AMF 355 may transmit, to the mobile IAB node 315, a ninth message 307-*c* indicating that the mobile IAB node 315 is authorized for the IAB operation and instructing the mobile IAB node 315 to operate in the IAB mode and perform the IAB operation. In some cases, the messages 304-*a*, 306-*a*, 307-*a*, 304-*b*, 306-*b*, 307-*b*, 304-*c*, 306-*c*, and 307-*c* may be exchanged on a NAS message, an RRC message, an F1 message, or any combination thereof.

In some examples, the mobile IAB node 315 may perform the IAB operation based on the instruction. For example, the IAB operation may include the mobile IAB node 315 serving one or more child nodes (e.g., other IAB nodes 315, UEs 320, etc.). The IAB operation may include the mobile IAB node 315 muting or broadcasting an IAB supported message (e.g., a SIB message). In some cases, the mobile IAB node 315 may broadcast the IAB supported message to the other IAB nodes to connect the other IAB nodes to the IAB network 300. In some cases, the IAB operation may include having (e.g., establishing, continuing, etc.) an F1 connection, among other examples.

In some cases, the IAB donor node 310 may perform operations based on the instruction. For example, the operations may include the IAB donor node 310 performing a handover procedure for the one or more child nodes. The handover procedure may include handing over the one or more child nodes from the mobile IAB node 315 to other connected IAB nodes if the IAB donor node 310 received instruction that the mobile IAB node 315 is unauthorized. If the IAB donor node 310 received instruction that the mobile IAB node 315 is authorized, the IAB donor node 310 may provide a connection to the one or more child nodes via the mobile IAB node 315 as part of the handover procedure.

In some examples, the operations may include having an F1 connection. For example, having the F1 connection may include releasing the F1 connection or resuming the F1 connection based on whether the mobile IAB node 315 is instructed to perform the IAB operation. In some cases, the F1 connection may be a connection between the CU 330 and the DU 340 or a connection between the IAB donor node 310 and the mobile IAB node 315.

In some examples, the operations may include whether to activate one or more cells. The one or more cells may be associated with the mobile IAB node 315 (e.g., the area 360) such that the mobile IAB node 315 may be currently inside the one or more cells, moving towards the one or more cells, moving away from the one or more cells, or any combination thereof. The IAB donor node 310 may determine to activate or deactivate the one or more cells based on the mobility status of the mobile IAB node 315, the instruction from the AMF 355, or both. In some examples, the operations may include configuring or releasing resources of the mobile IAB node 315 based on the instruction.

Figure 4:
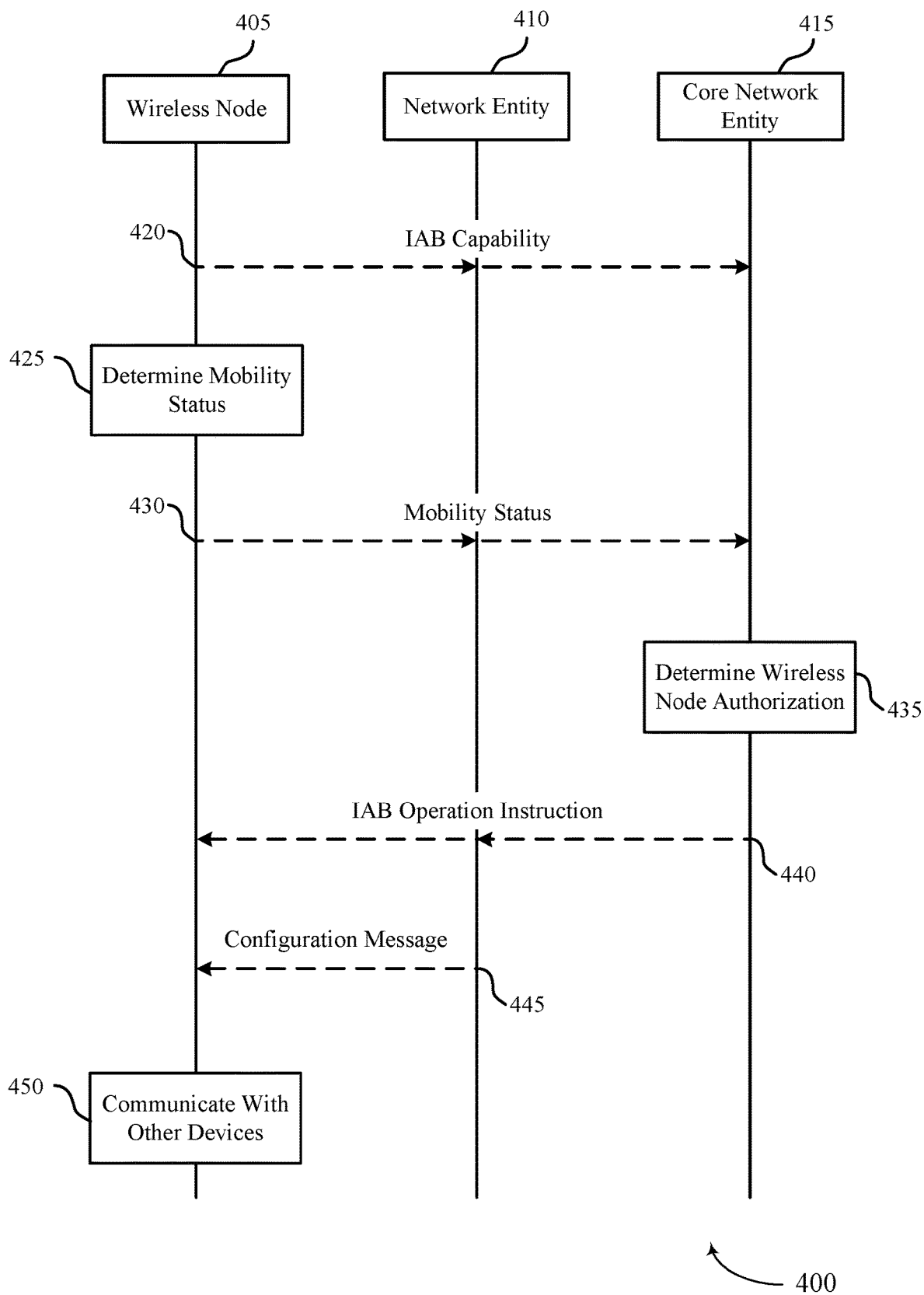
FIG. 4 illustrates an example of a process flow that supports conditional authorization of mobile nodes in accordance with aspects of the present disclosure.

FIG. 4 illustrates an example of a process flow 400 that supports conditional authorization of mobile nodes in accordance with aspects of the present disclosure. The process flow 400 may be related to operations performed by a wireless node 405, a network entity 410, and a core network entity 415, which may be respective examples of IAB nodes 215, IAB donor nodes 210, and a core network 205 as described with reference to FIGS. 1-3.

At 420, the wireless node 405 may optionally transmit a first message indicating an IAB capability of the wireless node 405 to the network entity 410, the core network entity 415, or both. If the network entity 410 received the IAB capability, the network entity 410 may transmit (e.g., forward) the IAB capability to the core network entity 415. The IAB capability may include a capability of the wireless node 405 to operate in an IAB mode by supporting communication for one or more child nodes (e.g., other wireless nodes 405, UEs 115, etc.) of the wireless node 405.

At 425, the wireless node 405 may determine a mobility status of the wireless node 405. In some examples, the mobility status may refer to whether the wireless node 405 is mobile or stationary, a speed (e.g., above or below a threshold speed), a current mobility status, a future mobility status, the mobility status associated with a location of the wireless node 405, or any combination thereof. In some cases, the network entity 410 may transmit the threshold speed to the wireless node 405. The mobility status may also indicate an area where the wireless node may perform an IAB operation or refrain from performing the IAB operation.

At 430, the wireless node 405 may optionally transmit a second message indicating the mobility status of the wireless node 405 to the network entity 410, the core network entity 415, or both. If the network entity 410 received the mobility status, the network entity 410 may transmit (e.g., forward) the mobility status to the core network entity 415. In some cases, the second message may be a part of the first message, such that the first message may indicate both the IAB capability and the mobility status of the wireless node 405.

At 435, the core network entity 415 may conditionally determine whether the wireless node 405 is authorized to perform the IAB operation based on the mobility status, the IAB capability, or both. In some cases, the determination may be further based on other considerations such as a subscription status of the wireless node 405.

At 440, the core network entity 415 may optionally transmit (to the network entity 410, the wireless node 405, or both), a third message instructing whether the wireless node 405 may operate in the IAB mode and perform the IAB operation. If the network entity 410 received the third message, the network entity 410 may transmit (e.g., forward) the instruction to the wireless node 405. In some cases, the network entity 410 may communicate with a child node of the wireless node 405 or provide a connection to the child node via the wireless node 405 based on the instruction.

At 445, the network entity 410 may optionally transmit, to the wireless node 405, a configuration message based on the instruction. In some cases, the configuration message may be associated with a network interface (e.g., F1) connection for the wireless node 405, whether to activate one or more cells of the wireless node 405, a resource configuration for the wireless node 405, or any combination thereof.

At 450, the wireless node 405 may perform the IAB operation. In some cases the IAB operation may include communicating with other devices (e.g., the child node), muting or broadcasting an IAB supported message via an SIB message to the other devices, having an F1 connection, or any combination thereof.

Figure 5:
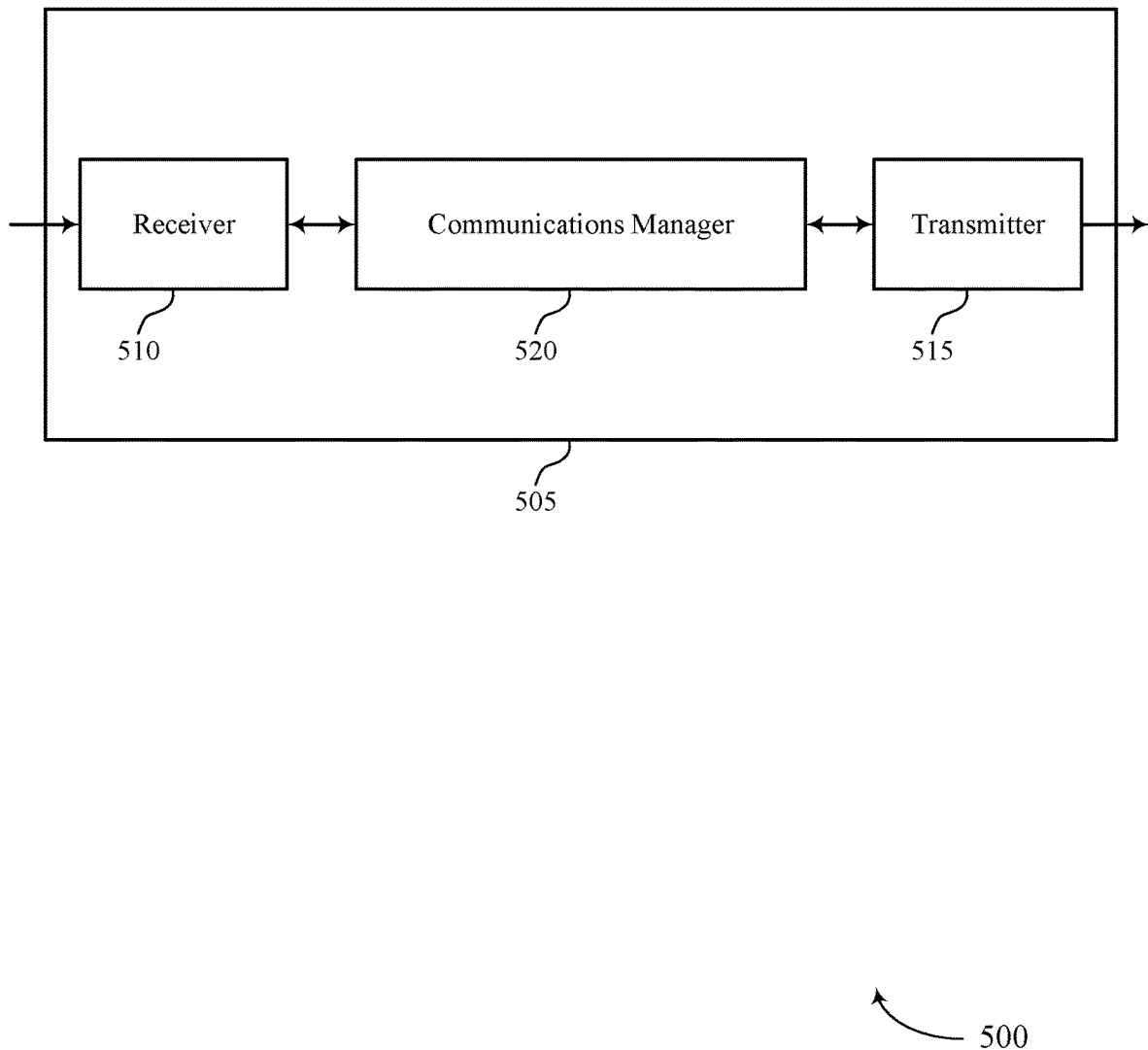
FIGS. 5 and 6 show block diagrams of devices that support conditional authorization of mobile nodes in accordance with aspects of the present disclosure.

FIG. 5 shows a block diagram 500 of a device 505 that supports conditional authorization of mobile nodes in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to conditional authorization of mobile nodes). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to conditional authorization of mobile nodes). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of conditional authorization of mobile nodes as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a wireless node in accordance with examples as disclosed herein. For example, the communications manager 520 may be configured as or otherwise support a means for transmitting, to a network entity, a first message including an indication of a capability of the wireless node to operate in an IAB mode by supporting communication for one or more child nodes of the wireless node. The communications manager 520 may be configured as or otherwise support a means for receiving, from the network entity, a second message in response to the first message, the second message instructing the wireless node to operate in the IAB mode based on the capability of the wireless node and a mobility status of the wireless node, the mobility status associated with a location of the wireless node, a speed of the wireless node, or both. The communications manager 520 may be configured as or otherwise support a means for communicating, by the wireless node operating in the IAB mode, with one or more devices based on the second message.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for efficient connection with an IAB network, increased flexibility for mobile operations, reduced power consumption, and more efficient utilization of communication resources.

Figure 6:
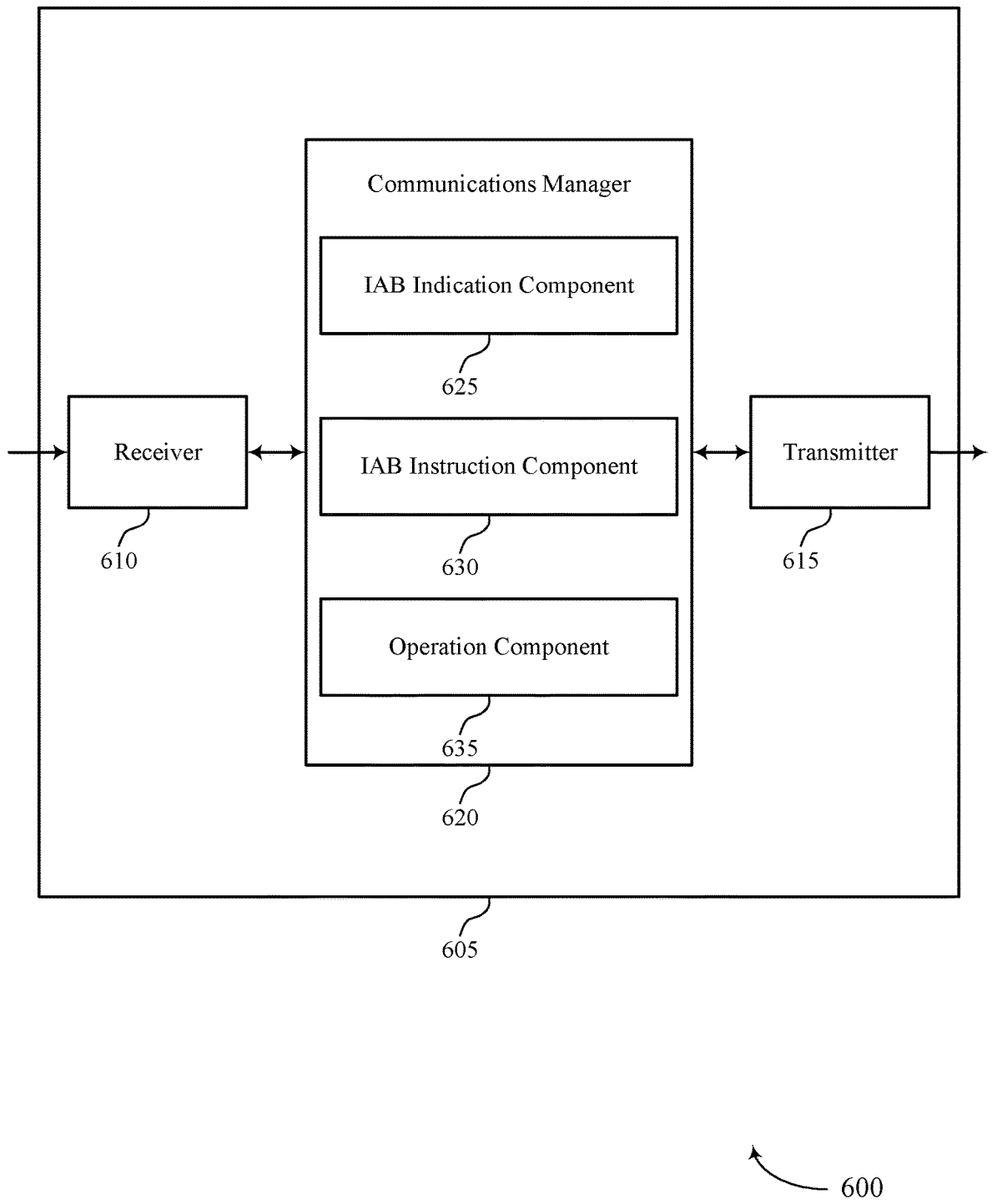

FIG. 6 shows a block diagram 600 of a device 605 that supports conditional authorization of mobile nodes in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to conditional authorization of mobile nodes). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to conditional authorization of mobile nodes). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of conditional authorization of mobile nodes as described herein. For example, the communications manager 620 may include an IAB indication component 625, an IAB instruction component 630, an operation component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a wireless node in accordance with examples as disclosed herein. The IAB indication component 625 may be configured as or otherwise support a means for transmitting, to a network entity, a first message including an indication of a capability of the wireless node to operate in an IAB mode by supporting communication for one or more child nodes of the wireless node. The IAB instruction component 630 may be configured as or otherwise support a means for receiving, from the network entity, a second message in response to the first message, the second message instructing the wireless node to operate in the IAB mode based on the capability of the wireless node and a mobility status of the wireless node, the mobility status associated with a location of the wireless node, a speed of the wireless node, or both. The operation component 635 may be configured as or otherwise support a means for communicating, by the wireless node operating in the IAB mode, with one or more devices based on the second message.

Figure 7:
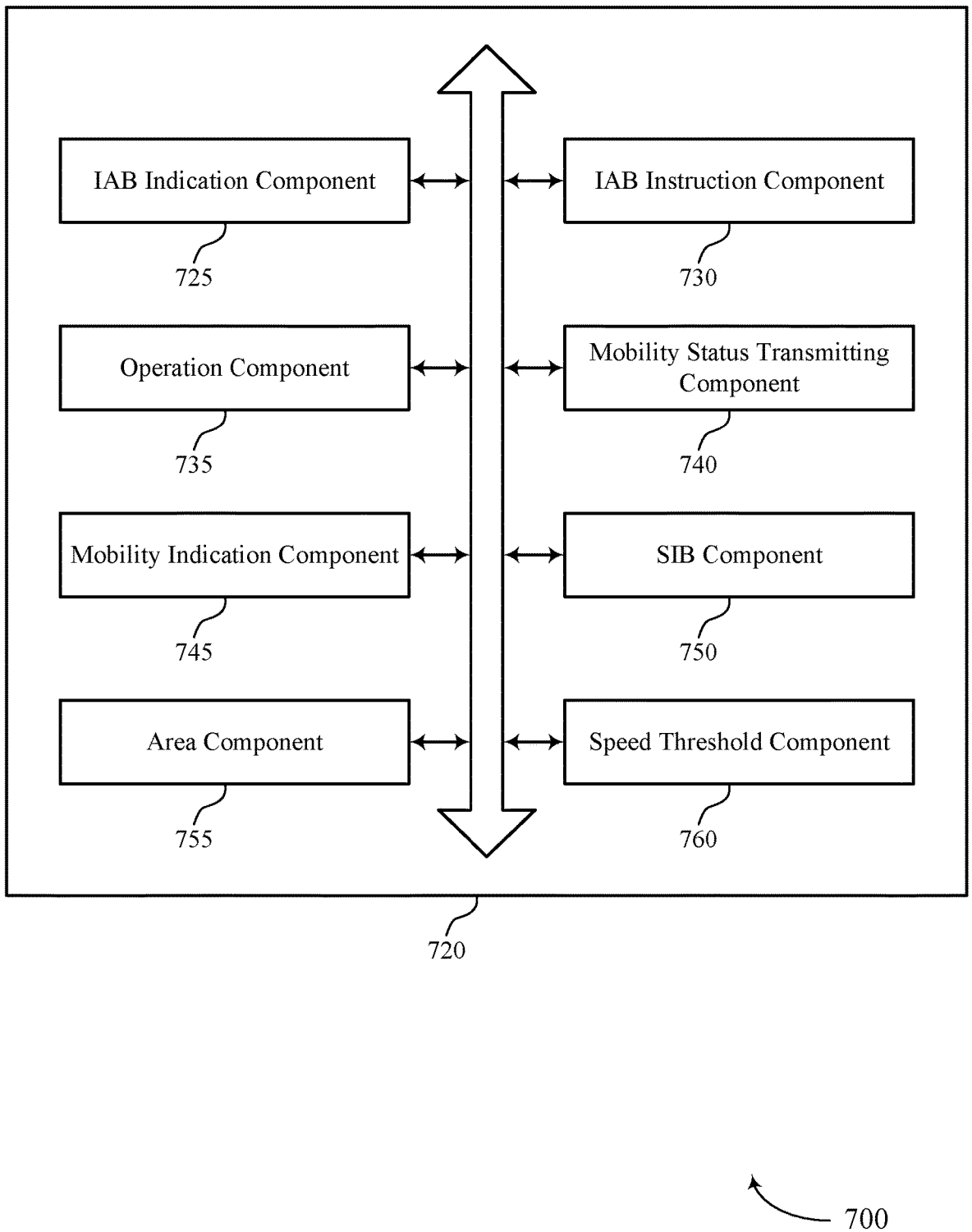
FIG. 7 shows a block diagram of a communications manager that supports conditional authorization of mobile nodes in accordance with aspects of the present disclosure.

FIG. 7 shows a block diagram 700 of a communications manager 720 that supports conditional authorization of mobile nodes in accordance with aspects of the present disclosure. The communications manager 720 may be an example of aspects of a communications manager 520, a communications manager 620, or both, as described herein. The communications manager 720, or various components thereof, may be an example of means for performing various aspects of conditional authorization of mobile nodes as described herein. For example, the communications manager 720 may include an IAB indication component 725, an IAB instruction component 730, an operation component 735, a mobility status transmitting component 740, a mobility indication component 745, an SIB component 750, an area component 755, a speed threshold component 760, or any combination thereof. Each of these components may communicate, directly or indirectly, with one another (e.g., via one or more buses).

The communications manager 720 may support wireless communication at a wireless node in accordance with examples as disclosed herein. The IAB indication component 725 may be configured as or otherwise support a means for transmitting, to a network entity, a first message including an indication of a capability of the wireless node to operate in an IAB mode by supporting communication for one or more child nodes of the wireless node. The IAB instruction component 730 may be configured as or otherwise support a means for receiving, from the network entity, a second message in response to the first message, the second message instructing the wireless node to operate in the IAB mode based on the capability of the wireless node and a mobility status of the wireless node, the mobility status associated with a location of the wireless node, a speed of the wireless node, or both. The operation component 735 may be configured as or otherwise support a means for communicating, by the wireless node operating in the IAB mode, with one or more devices based on the second message.

In some examples, the mobility status transmitting component 740 may be configured as or otherwise support a means for transmitting, to the network entity, a third message indicating the mobility status of the wireless node based on the capability of the wireless node to operate in the IAB mode.

In some examples, to support transmitting the first message, the IAB indication component 725 may be configured as or otherwise support a means for transmitting the mobility status of the wireless node to the network entity in the first message.

In some examples, the mobility indication component 745 may be configured as or otherwise support a means for determining the mobility status of the wireless node, where the mobility status is one of stationary or mobile. In some examples, the mobility status transmitting component 740 may be configured as or otherwise support a means for transmitting the mobility status to the network entity.

In some examples, the mobility status transmitting component 740 may be configured as or otherwise support a means for transmitting the mobility status to the network entity, where the mobility status is based on the speed of the wireless node relative to a speed threshold.

In some examples, the speed threshold component 760 may be configured as or otherwise support a means for receiving an indication of the speed threshold from the network entity.

In some examples, the mobility status indicates the speed of the wireless node relative to the speed threshold.

In some examples, the SIB component 750 may be configured as or otherwise support a means for transmitting a broadcast message indicating the wireless node operating in the IAB mode based on the second message, where the broadcast message includes a SIB.

In some examples, to support receiving the second message, the area component 755 may be configured as or otherwise support a means for receiving an indication of an area for the wireless node to operate in the IAB mode in the second message.

In some examples, to support communicating with the one or more devices, the operation component 735 may be configured as or otherwise support a means for communicating, by the wireless node operating in the IAB mode, with the one or more devices in the area for the wireless node to operate in the IAB mode.

In some examples, the area includes a cell, a radio access network based notification area code, a tracking area, a portion of a cell, a geographical area, or any combination thereof.

In some examples, to support communicating with the one or more devices, the operation component 735 may be configured as or otherwise support a means for communicating, by the wireless node operating in the IAB mode, with a child wireless node of the wireless node.

In some examples, operating in the IAB mode is based on an F1 connection associated with the wireless node.

In some examples, the first message, the second message, or both are communicated using one of a non-access stratum, a RRC message, a network interface, or any combination thereof.

Figure 8:
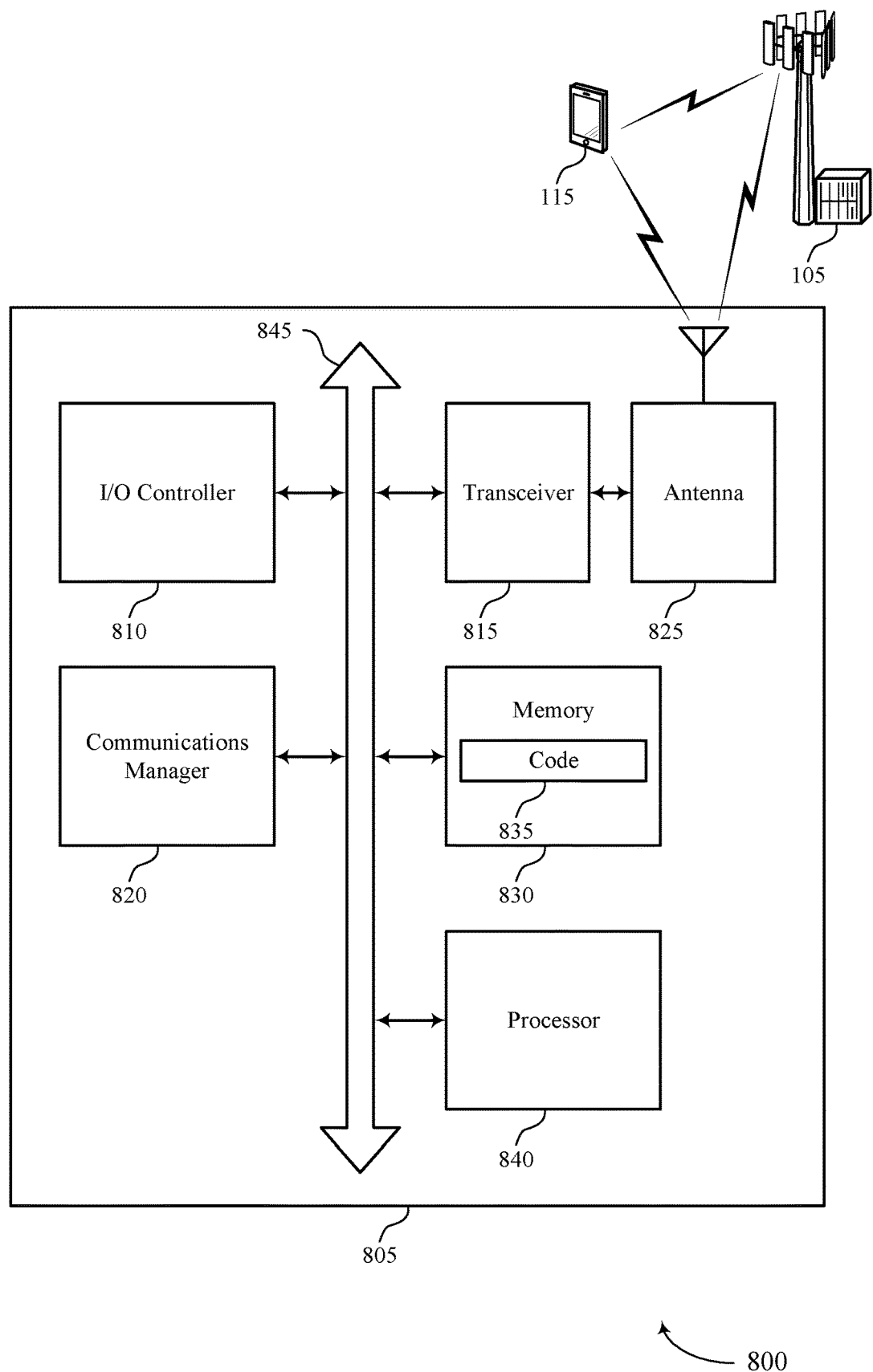
FIG. 8 shows a diagram of a system including a device that supports conditional authorization of mobile nodes in accordance with aspects of the present disclosure.

FIG. 8 shows a diagram of a system 800 including a device 805 that supports conditional authorization of mobile nodes in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting conditional authorization of mobile nodes). For example, the device 805 or a component of the device 805 may include a processor 840 and memory 830 coupled with or to the processor 840, the processor 840 and memory 830 configured to perform various functions described herein.

The communications manager 820 may support wireless communication at a wireless node in accordance with examples as disclosed herein. For example, the communications manager 820 may be configured as or otherwise support a means for transmitting, to a network entity, a first message including an indication of a capability of the wireless node to operate in an IAB mode by supporting communication for one or more child nodes of the wireless node. The communications manager 820 may be configured as or otherwise support a means for receiving, from the network entity, a second message in response to the first message, the second message instructing the wireless node to operate in the IAB mode based on the capability of the wireless node and a mobility status of the wireless node, the mobility status associated with a location of the wireless node, a speed of the wireless node, or both. The communications manager 820 may be configured as or otherwise support a means for communicating, by the wireless node operating in the IAB mode, with one or more devices based on the second message.

By including or configuring the communications manager 820 in accordance with examples as described herein, the device 805 may support techniques for efficient connection with an IAB network, increased flexibility for mobile operations, reduced power consumption, more efficient utilization of communication resources, improved communication reliability, and improved coordination between devices.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of conditional authorization of mobile nodes as described herein, or the processor 840 and the memory 830 may be otherwise configured to perform or support such operations.

Figure 9:
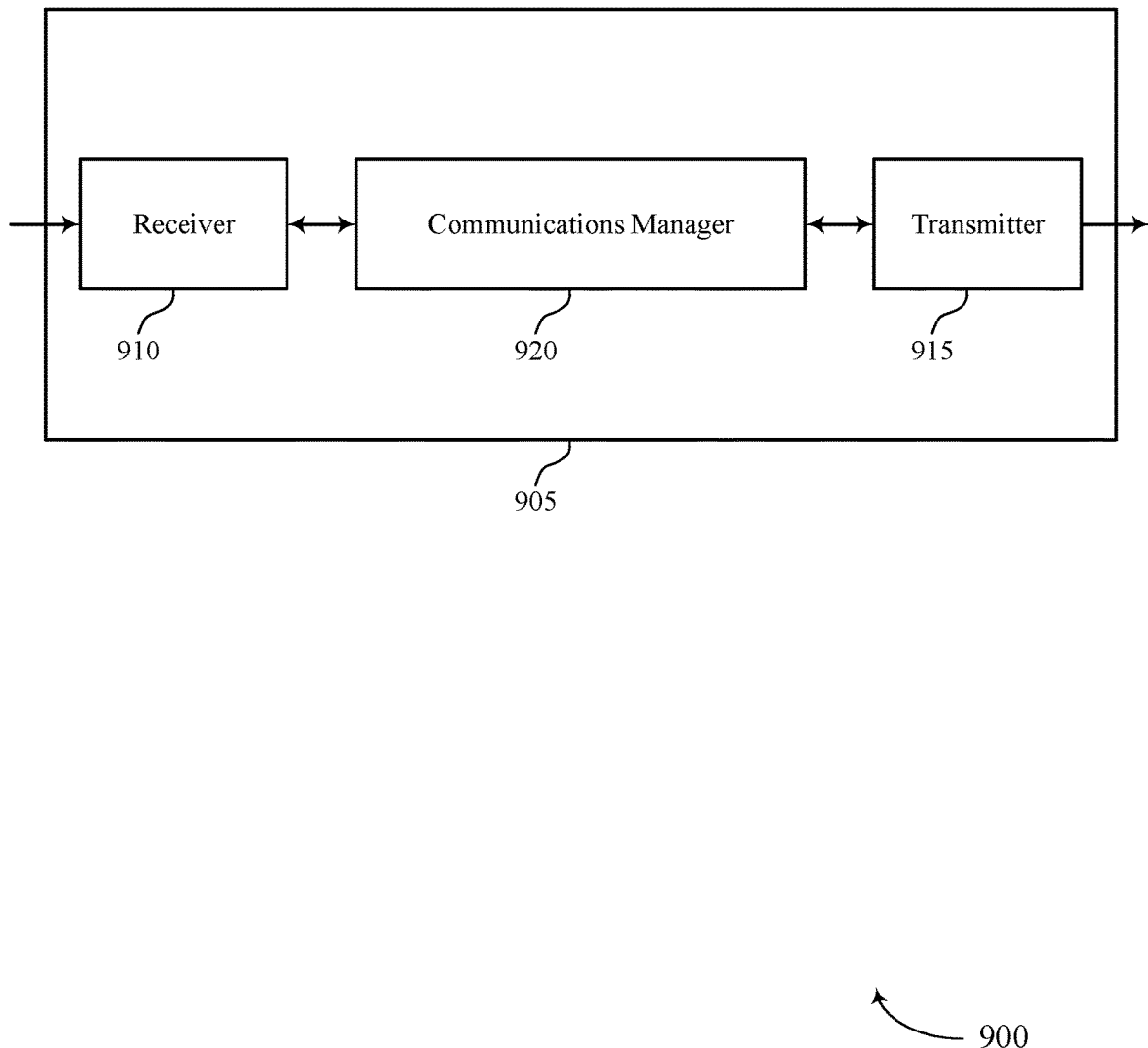
FIGS. 9 and 10 show block diagrams of devices that support conditional authorization of mobile nodes in accordance with aspects of the present disclosure.

FIG. 9 shows a block diagram 900 of a device 905 that supports conditional authorization of mobile nodes in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to conditional authorization of mobile nodes). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to conditional authorization of mobile nodes). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of conditional authorization of mobile nodes as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a network entity in accordance with examples as disclosed herein. For example, the communications manager 920 may be configured as or otherwise support a means for receiving, from a wireless node, a first message including an indication of a capability of the wireless node to operate in an IAB mode by supporting communication for one or more child nodes of the wireless node. The communications manager 920 may be configured as or otherwise support a means for transmitting, to a core network entity, a second message in response to the first message, the second message including the indication of the capability of the wireless node to operate in the IAB mode. The communications manager 920 may be configured as or otherwise support a means for receiving, from the core network entity, a third message in response to the second message, the third message instructing the wireless node whether to operate in the IAB mode based on the capability of the wireless node and a mobility status of the wireless node, the mobility status associated with a location of the wireless node, a speed of the wireless node, or both. The communications manager 920 may be configured as or otherwise support a means for transmitting, to the wireless node, a fourth message in response to the third message, the fourth message instructing the wireless node whether to operate in the IAB mode.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for efficient connection with an IAB network, increased flexibility for mobile operations, reduced power consumption, and more efficient utilization of communication resources.

Figure 10:
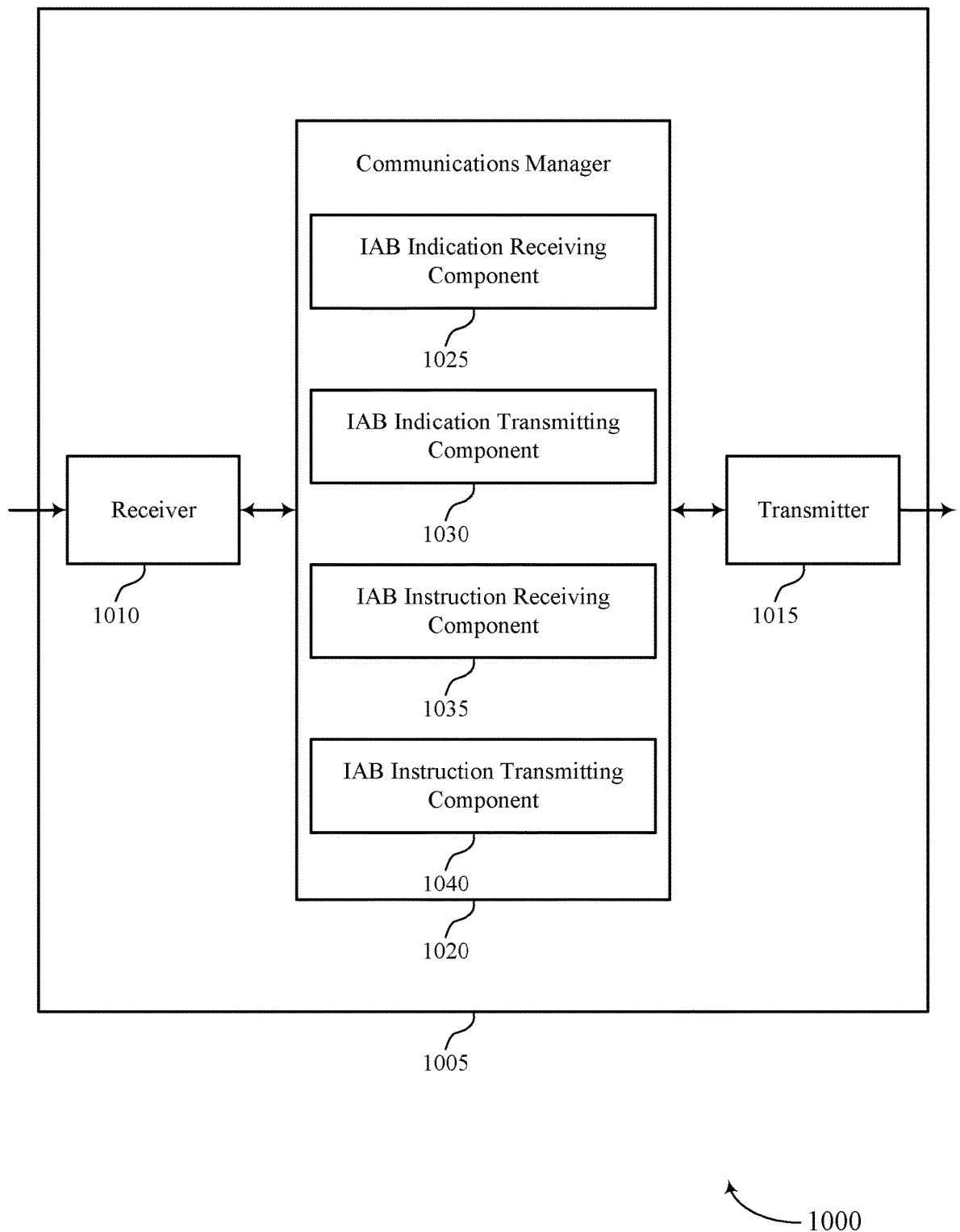

FIG. 10 shows a block diagram 1000 of a device 1005 that supports conditional authorization of mobile nodes in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to conditional authorization of mobile nodes). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to conditional authorization of mobile nodes). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of conditional authorization of mobile nodes as described herein. For example, the communications manager 1020 may include an IAB indication receiving component 1025, an IAB indication transmitting component 1030, an IAB instruction receiving component 1035, an IAB instruction transmitting component 1040, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a network entity in accordance with examples as disclosed herein. The IAB indication receiving component 1025 may be configured as or otherwise support a means for receiving, from a wireless node, a first message including an indication of a capability of the wireless node to operate in an IAB mode by supporting communication for one or more child nodes of the wireless node. The IAB indication transmitting component 1030 may be configured as or otherwise support a means for transmitting, to a core network entity, a second message in response to the first message, the second message including the indication of the capability of the wireless node to operate in the IAB mode. The IAB instruction receiving component 1035 may be configured as or otherwise support a means for receiving, from the core network entity, a third message in response to the second message, the third message instructing the wireless node whether to operate in the IAB mode based on the capability of the wireless node and a mobility status of the wireless node, the mobility status associated with a location of the wireless node, a speed of the wireless node, or both. The IAB instruction transmitting component 1040 may be configured as or otherwise support a means for transmitting, to the wireless node, a fourth message in response to the third message, the fourth message instructing the wireless node whether to operate in the IAB mode.

Figure 11:
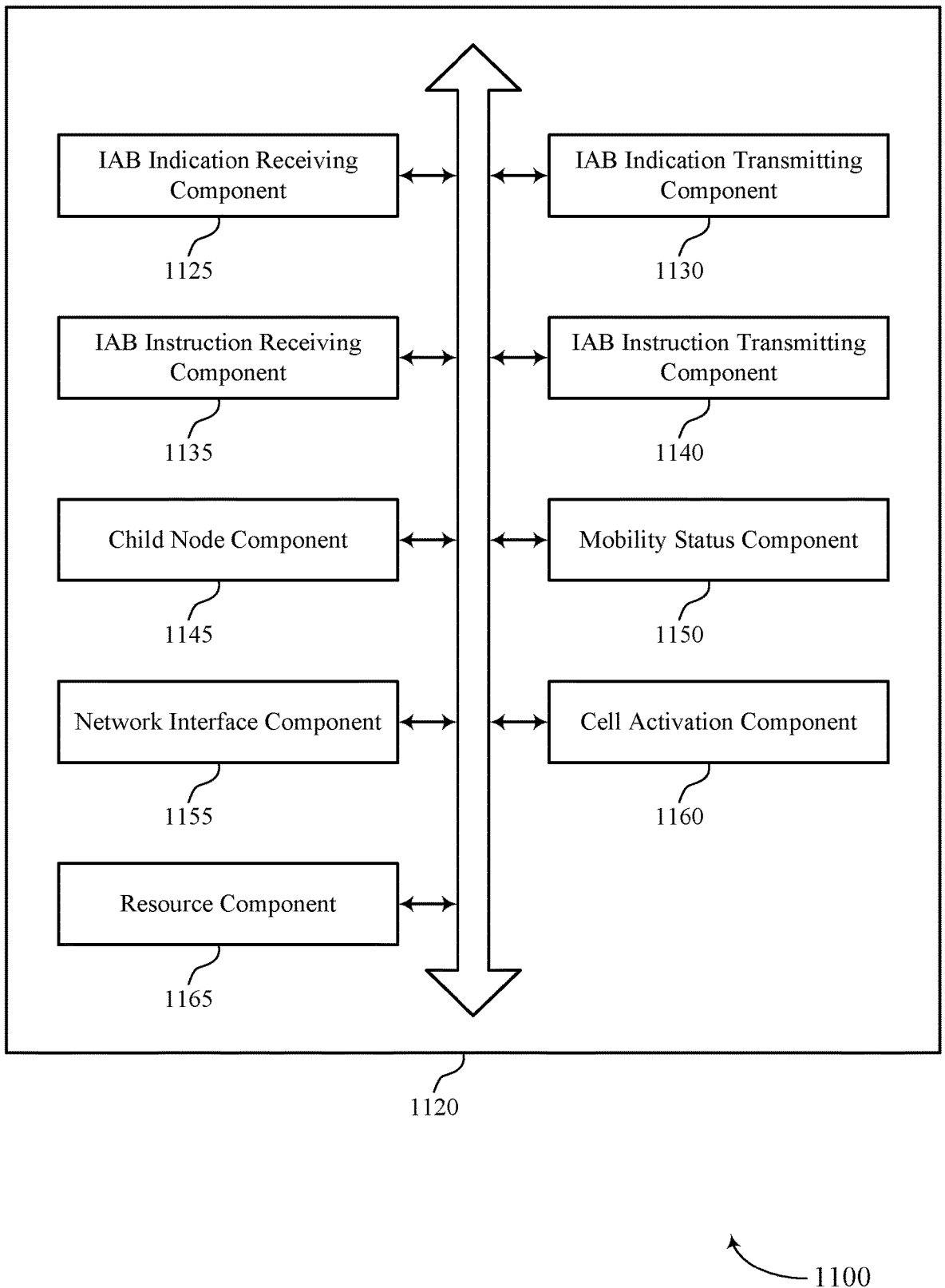
FIG. 11 shows a block diagram of a communications manager that supports conditional authorization of mobile nodes in accordance with aspects of the present disclosure.

FIG. 11 shows a block diagram 1100 of a communications manager 1120 that supports conditional authorization of mobile nodes in accordance with aspects of the present disclosure. The communications manager 1120 may be an example of aspects of a communications manager 920, a communications manager 1020, or both, as described herein. The communications manager 1120, or various components thereof, may be an example of means for performing various aspects of conditional authorization of mobile nodes as described herein. For example, the communications manager 1120 may include an IAB indication receiving component 1125, an IAB indication transmitting component 1130, an IAB instruction receiving component 1135, an IAB instruction transmitting component 1140, a child node component 1145, a mobility status component 1150, a network interface component 1155, a cell activation component 1160, a resource component 1165, or any combination thereof. Each of these components may communicate, directly or indirectly, with one another (e.g., via one or more buses).

The communications manager 1120 may support wireless communication at a network entity in accordance with examples as disclosed herein. The IAB indication receiving component 1125 may be configured as or otherwise support a means for receiving, from a wireless node, a first message including an indication of a capability of the wireless node to operate in an IAB mode by supporting communication for one or more child nodes of the wireless node. The IAB indication transmitting component 1130 may be configured as or otherwise support a means for transmitting, to a core network entity, a second message in response to the first message, the second message including the indication of the capability of the wireless node to operate in the IAB mode. The IAB instruction receiving component 1135 may be configured as or otherwise support a means for receiving, from the core network entity, a third message in response to the second message, the third message instructing the wireless node whether to operate in the IAB mode based on the capability of the wireless node and a mobility status of the wireless node, the mobility status associated with a location of the wireless node, a speed of the wireless node, or both. The IAB instruction transmitting component 1140 may be configured as or otherwise support a means for transmitting, to the wireless node, a fourth message in response to the third message, the fourth message instructing the wireless node whether to operate in the IAB mode.

In some examples, the child node component 1145 may be configured as or otherwise support a means for communicating with a child wireless node of the wireless node based on instructing the wireless node to operate in the IAB mode.

In some examples, the mobility status component 1150 may be configured as or otherwise support a means for receiving, from the wireless node, a fifth message indicating the mobility status of the wireless node based on the capability of the wireless node to operate in the IAB mode.

In some examples, to support receiving the first message, the IAB indication receiving component 1125 may be configured as or otherwise support a means for receiving the mobility status of the wireless node from the wireless node in the first message.

In some examples, to support transmitting the fourth message, the IAB instruction transmitting component 1140 may be configured as or otherwise support a means for transmitting the fourth message to a second wireless node based on a handover procedure and the third message, the fourth message instructing the second wireless node to communicate with a child wireless node of the wireless node.

In some examples, the network interface component 1155 may be configured as or otherwise support a means for transmitting, to the wireless node, a fifth message in response to the third message, the fifth message associated with a network interface connection.

In some examples, the cell activation component 1160 may be configured as or otherwise support a means for transmitting a fifth message in response to the third message, the fifth message associated with activation of one or more cells of the wireless node.

In some examples, the resource component 1165 may be configured as or otherwise support a means for transmitting a fifth message in response to the third message, the fifth message associated with configuring resources of the wireless node.

Figure 12:
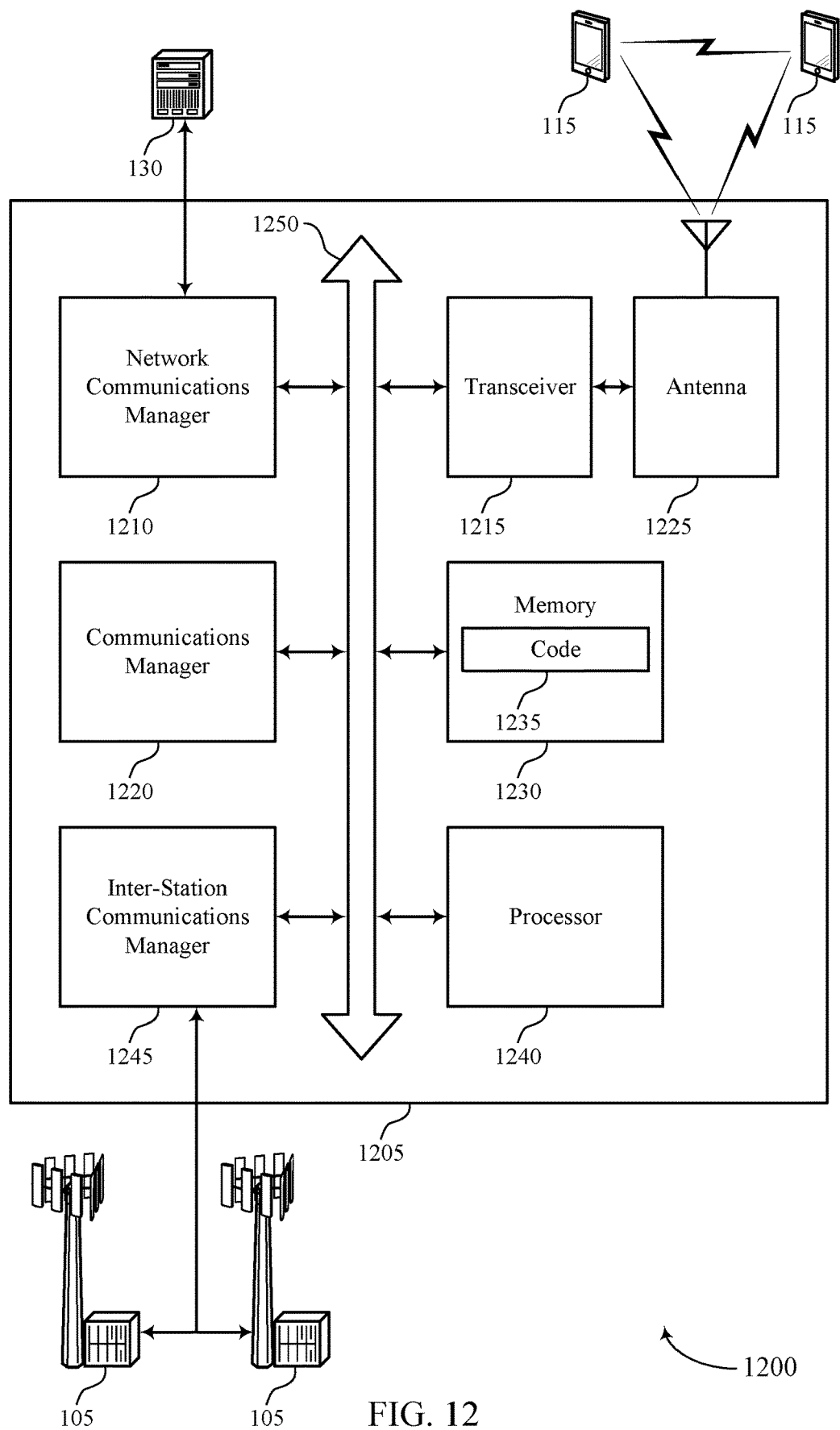
FIG. 12 shows a diagram of a system including a device that supports conditional authorization of mobile nodes in accordance with aspects of the present disclosure.

FIG. 12 shows a diagram of a system 1200 including a device 1205 that supports conditional authorization of mobile nodes in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory.

In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting conditional authorization of mobile nodes). For example, the device 1205 or a component of the device 1205 may include a processor 1240 and memory 1230 coupled with or to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a network entity in accordance with examples as disclosed herein. For example, the communications manager 1220 may be configured as or otherwise support a means for receiving, from a wireless node, a first message including an indication of a capability of the wireless node to operate in an IAB mode by supporting communication for one or more child nodes of the wireless node. The communications manager 1220 may be configured as or otherwise support a means for transmitting, to a core network entity, a second message in response to the first message, the second message including the indication of the capability of the wireless node to operate in the IAB mode. The communications manager 1220 may be configured as or otherwise support a means for receiving, from the core network entity, a third message in response to the second message, the third message instructing the wireless node whether to operate in the IAB mode based on the capability of the wireless node and a mobility status of the wireless node, the mobility status associated with a location of the wireless node, a speed of the wireless node, or both. The communications manager 1220 may be configured as or otherwise support a means for transmitting, to the wireless node, a fourth message in response to the third message, the fourth message instructing the wireless node whether to operate in the IAB mode.

By including or configuring the communications manager 1220 in accordance with examples as described herein, the device 1205 may support techniques for efficient connection with an IAB network, increased flexibility for mobile operations, reduced power consumption, more efficient utilization of communication resources, improved communication reliability, and improved coordination between devices.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of conditional authorization of mobile nodes as described herein, or the processor 1240 and the memory 1230 may be otherwise configured to perform or support such operations.

Figure 13:
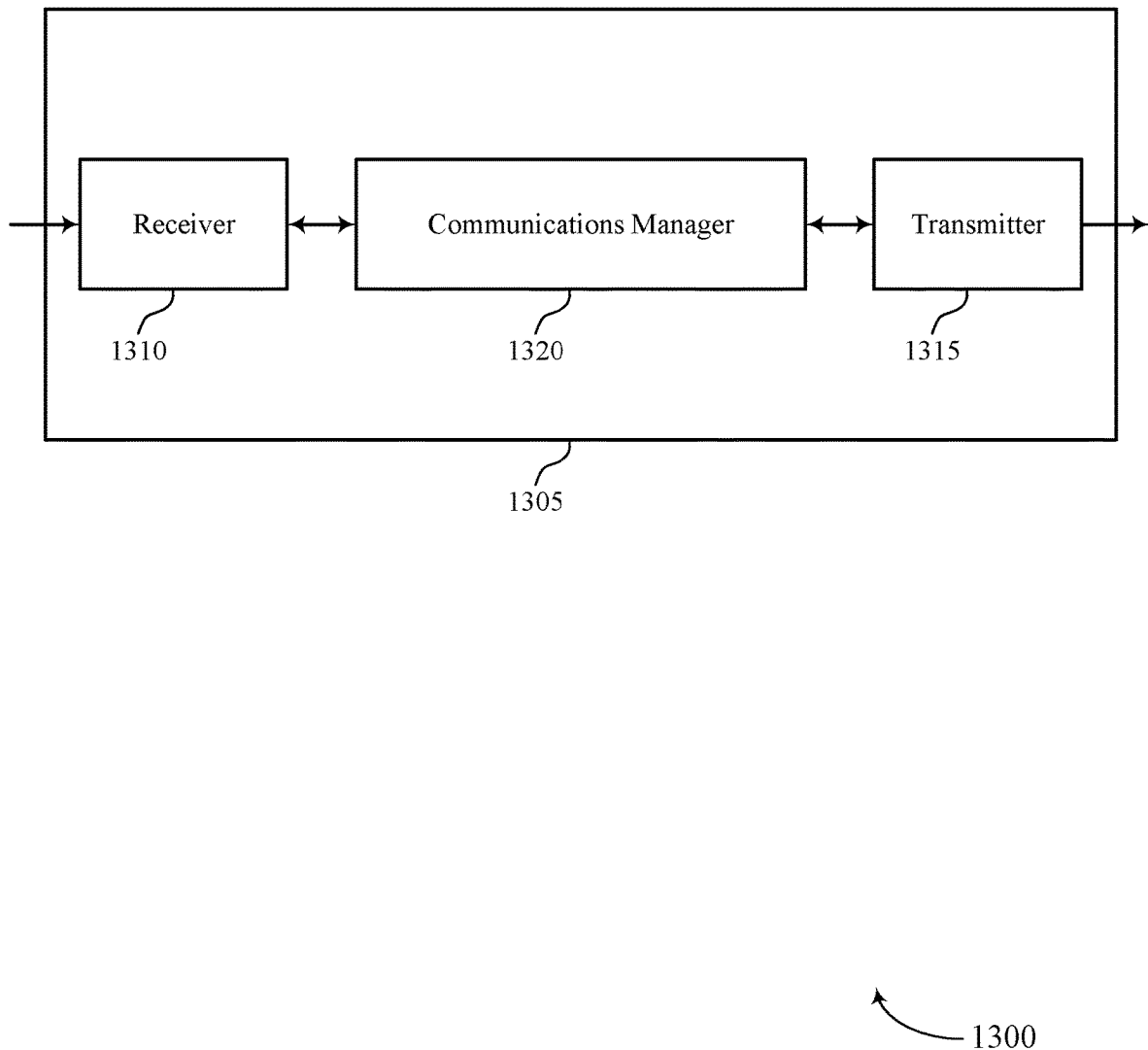
FIGS. 13 and 14 show block diagrams of devices that support conditional authorization of mobile nodes in accordance with aspects of the present disclosure.

FIG. 13 shows a block diagram 1300 of a device 1305 that supports conditional authorization of mobile nodes in accordance with aspects of the present disclosure. The device 1305 may be an example of aspects of a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to conditional authorization of mobile nodes). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to conditional authorization of mobile nodes). In some examples, the transmitter 1315 may be co-located with a receiver 1310 in a transceiver module. The transmitter 1315 may utilize a single antenna or a set of multiple antennas.

The communications manager 1320, the receiver 1310, the transmitter 1315, or various combinations thereof or various components thereof may be examples of means for performing various aspects of conditional authorization of mobile nodes as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1320 may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication at a core network entity in accordance with examples as disclosed herein. For example, the communications manager 1320 may be configured as or otherwise support a means for receiving, from a network entity, a first message including an indication of a capability of a wireless node to operate in an IAB mode by supporting communications with one or more child nodes of the wireless node. The communications manager 1320 may be configured as or otherwise support a means for determining whether to authorize the wireless node to operate in the IAB mode based on the capability of the wireless node and a mobility status of the wireless node, the mobility status associated with a location of the wireless node, a speed of the wireless node, or both. The communications manager 1320 may be configured as or otherwise support a means for transmitting a second message in response to the first message, the second message instructing the wireless node whether to operate in the IAB mode based on the determining.

By including or configuring the communications manager 1320 in accordance with examples as described herein, the device 1305 (e.g., a processor controlling or otherwise coupled to the receiver 1310, the transmitter 1315, the communications manager 1320, or a combination thereof) may support techniques for efficient connection with an IAB network, increased flexibility for mobile operations, reduced power consumption, and more efficient utilization of communication resources.

Figure 14:
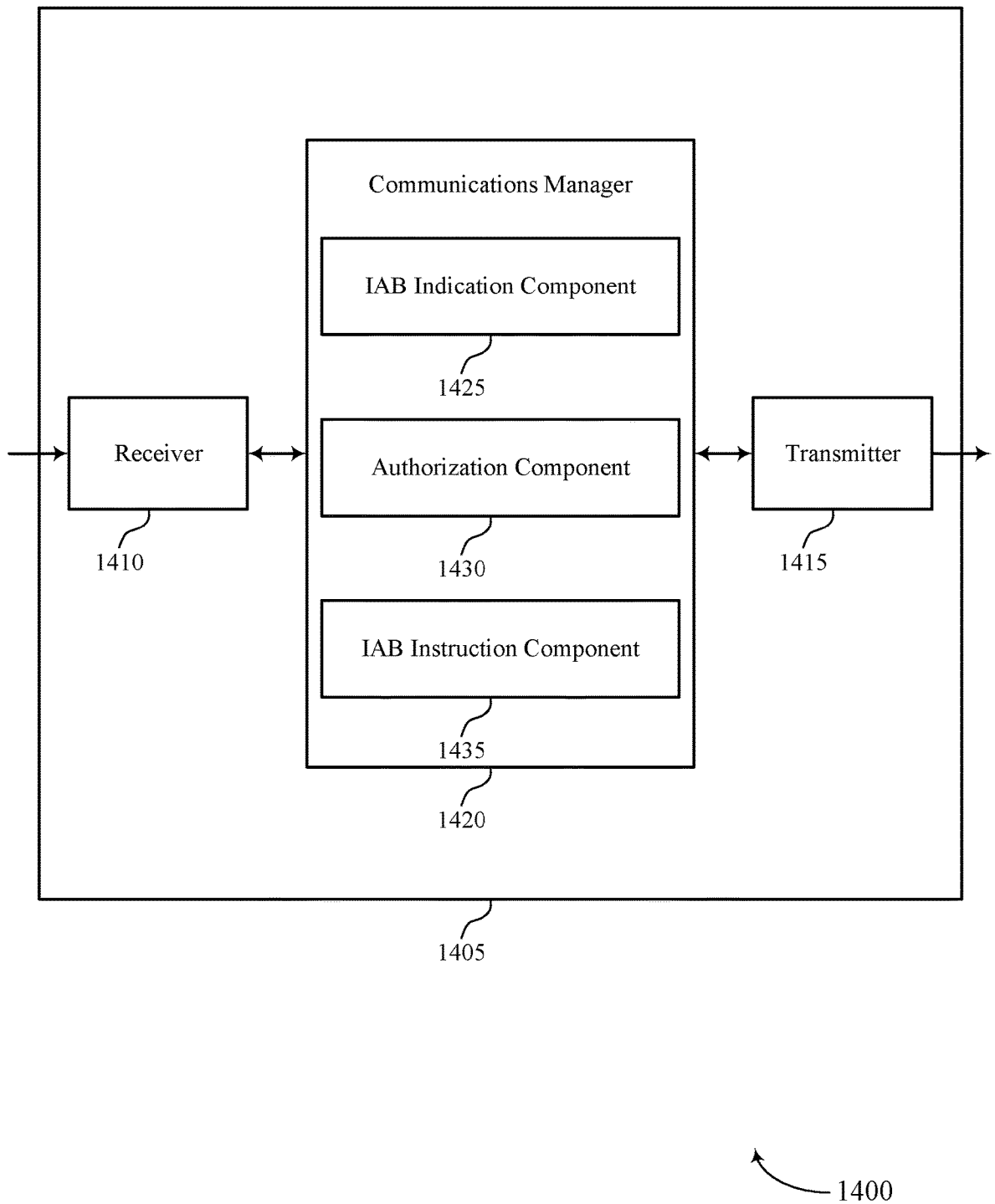

FIG. 14 shows a block diagram 1400 of a device 1405 that supports conditional authorization of mobile nodes in accordance with aspects of the present disclosure. The device 1405 may be an example of aspects of a device 1305 or a base station 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to conditional authorization of mobile nodes). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to conditional authorization of mobile nodes). In some examples, the transmitter 1415 may be co-located with a receiver 1410 in a transceiver module. The transmitter 1415 may utilize a single antenna or a set of multiple antennas.

The device 1405, or various components thereof, may be an example of means for performing various aspects of conditional authorization of mobile nodes as described herein. For example, the communications manager 1420 may include an IAB indication component 1425, an authorization component 1430, an IAB instruction component 1435, or any combination thereof. The communications manager 1420 may be an example of aspects of a communications manager 1320 as described herein. In some examples, the communications manager 1420, or various components thereof, may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communication at a core network entity in accordance with examples as disclosed herein. The IAB indication component 1425 may be configured as or otherwise support a means for receiving, from a network entity, a first message including an indication of a capability of a wireless node to operate in an IAB mode by supporting communications with one or more child nodes of the wireless node. The authorization component 1430 may be configured as or otherwise support a means for determining whether to authorize the wireless node to operate in the IAB mode based on the capability of the wireless node and a mobility status of the wireless node, the mobility status associated with a location of the wireless node, a speed of the wireless node, or both. The IAB instruction component 1435 may be configured as or otherwise support a means for transmitting a second message in response to the first message, the second message instructing the wireless node whether to operate in the IAB mode based on the determining.

Figure 15:
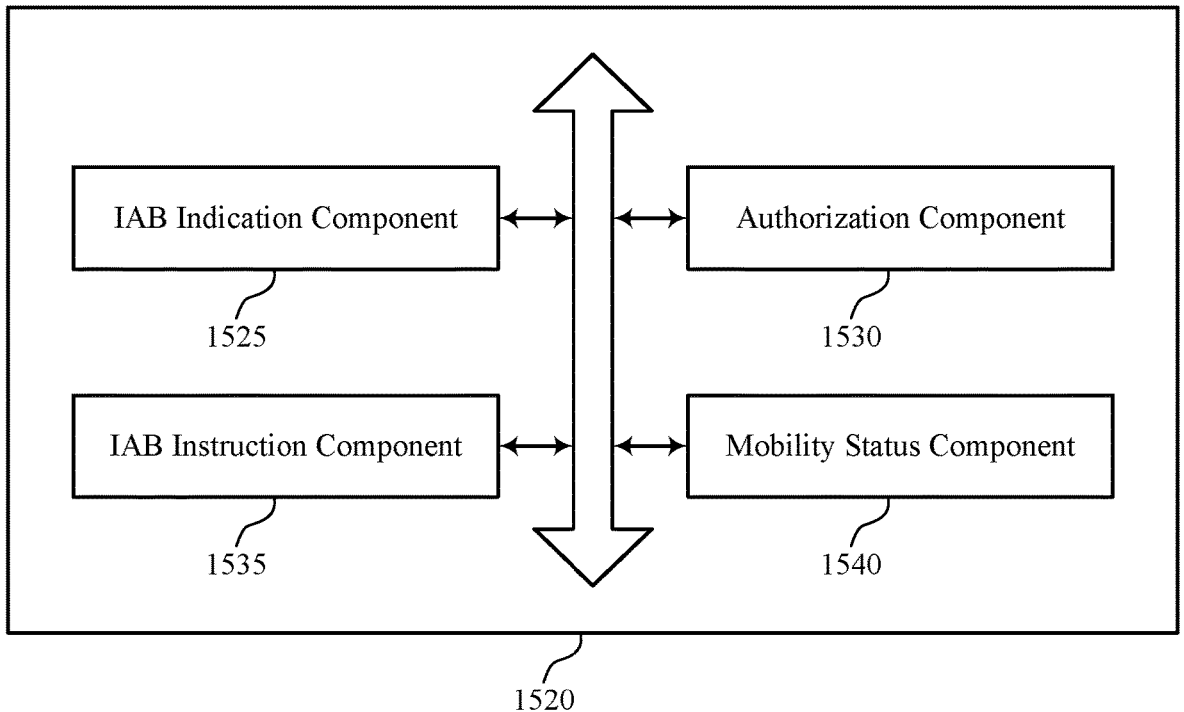
FIG. 15 shows a block diagram of a communications manager that supports conditional authorization of mobile nodes in accordance with aspects of the present disclosure.

FIG. 15 shows a block diagram 1500 of a communications manager 1520 that supports conditional authorization of mobile nodes in accordance with aspects of the present disclosure. The communications manager 1520 may be an example of aspects of a communications manager 1320, a communications manager 1420, or both, as described herein. The communications manager 1520, or various components thereof, may be an example of means for performing various aspects of conditional authorization of mobile nodes as described herein. For example, the communications manager 1520 may include an IAB indication component 1525, an authorization component 1530, an IAB instruction component 1535, a mobility status component 1540, or any combination thereof. Each of these components may communicate, directly or indirectly, with one another (e.g., via one or more buses).

The communications manager 1520 may support wireless communication at a core network entity in accordance with examples as disclosed herein. The IAB indication component 1525 may be configured as or otherwise support a means for receiving, from a network entity, a first message including an indication of a capability of a wireless node to operate in an IAB mode by supporting communications with one or more child nodes of the wireless node. The authorization component 1530 may be configured as or otherwise support a means for determining whether to authorize the wireless node to operate in the IAB mode based on the capability of the wireless node and a mobility status of the wireless node, the mobility status associated with a location of the wireless node, a speed of the wireless node, or both. The IAB instruction component 1535 may be configured as or otherwise support a means for transmitting a second message in response to the first message, the second message instructing the wireless node whether to operate in the IAB mode based on the determining.

In some examples, the mobility status component 1540 may be configured as or otherwise support a means for receiving, from the network entity, a third message indicating the mobility status of the wireless node based on the capability of the wireless node to operate in the IAB mode.

In some examples, to support receiving the first message, the IAB indication component 1525 may be configured as or otherwise support a means for receiving the mobility status of the wireless node from the network entity in the first message.

In some examples, transmitting the second message includes transmitting the second message to the wireless node, the network entity, or both.

Figure 16:
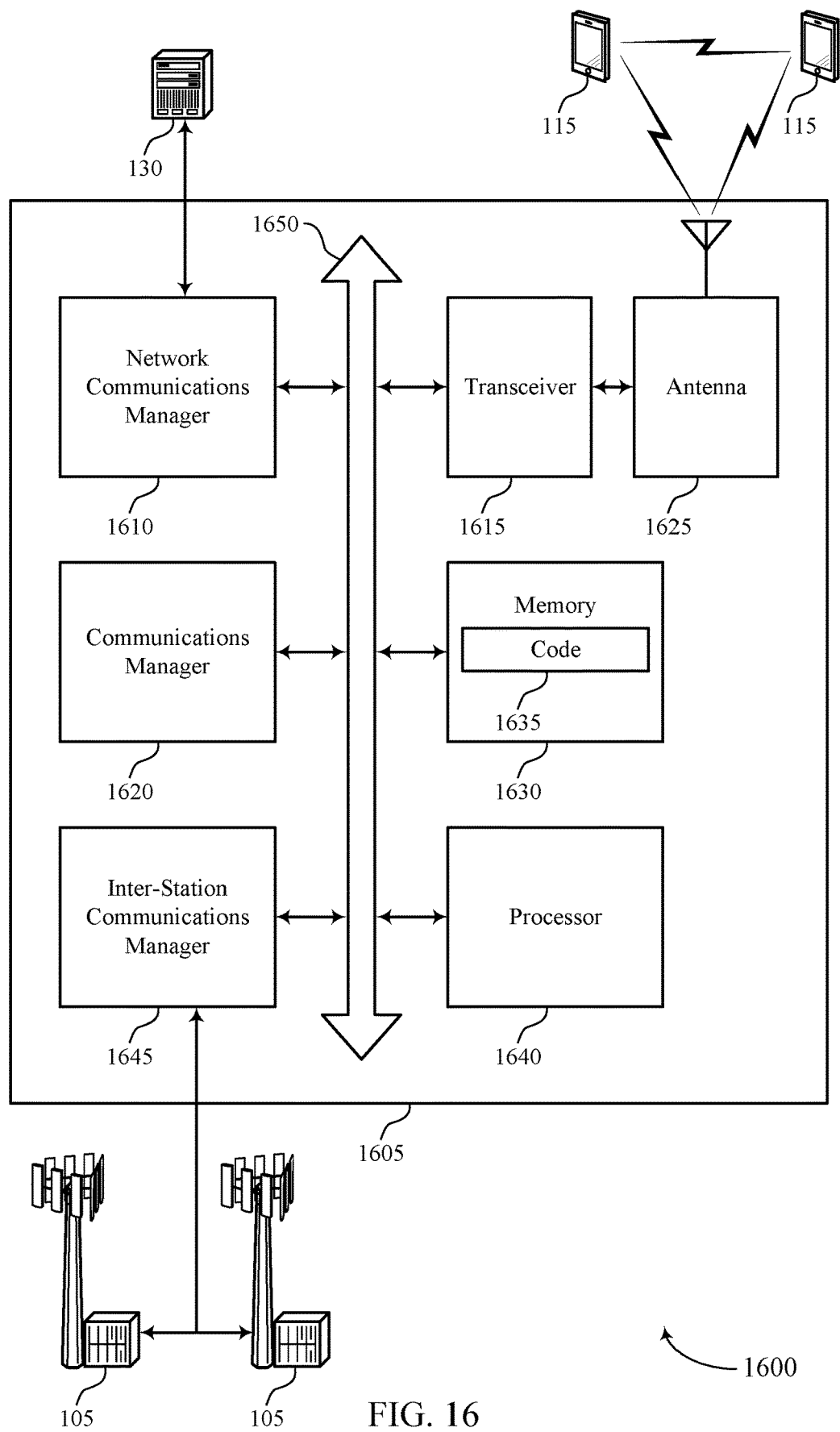
FIG. 16 shows a diagram of a system including a device that supports conditional authorization of mobile nodes in accordance with aspects of the present disclosure.

FIG. 16 shows a diagram of a system 1600 including a device 1605 that supports conditional authorization of mobile nodes in accordance with aspects of the present disclosure. The device 1605 may be an example of or include the components of a device 1305, a device 1405, or a base station 105 as described herein. The device 1605 may include components for bi-directional voice and data communications including components for transmitting and receiving communications, such as a communications manager 1620, a network communications manager 1610, a transceiver 1615, an antenna 1625, a memory 1630, code 1635, a processor 1640, and an inter-station communications manager 1645. These components may be in electronic communication or otherwise coupled (e.g., operatively, communicatively, functionally, electronically, electrically) via one or more buses (e.g., a bus 1650).

The network communications manager 1610 may manage communications with a core network 130 (e.g., via one or more wired backhaul links). For example, the network communications manager 1610 may manage the transfer of data communications for client devices, such as one or more UEs 115.

In some cases, the device 1605 may include a single antenna 1625. However, in some other cases the device 1605 may have more than one antenna 1625, which may be capable of concurrently transmitting or receiving multiple wireless transmissions. The transceiver 1615 may communicate bi-directionally, via the one or more antennas 1625, wired, or wireless links as described herein. For example, the transceiver 1615 may represent a wireless transceiver and may communicate bi-directionally with another wireless transceiver. The transceiver 1615 may also include a modem to modulate the packets, to provide the modulated packets to one or more antennas 1625 for transmission, and to demodulate packets received from the one or more antennas 1625. The transceiver 1615, or the transceiver 1615 and one or more antennas 1625, may be an example of a transmitter 1315, a transmitter 1415, a receiver 1310, a receiver 1410, or any combination thereof or component thereof, as described herein.

The memory 1630 may include RAM and ROM. The memory 1630 may store computer-readable, computer-executable code 1635 including instructions that, when executed by the processor 1640, cause the device 1605 to perform various functions described herein. The code 1635 may be stored in a non-transitory computer-readable medium such as system memory or another type of memory. In some cases, the code 1635 may not be directly executable by the processor 1640 but may cause a computer (e.g., when compiled and executed) to perform functions described herein. In some cases, the memory 1630 may contain, among other things, a BIOS which may control basic hardware or software operation such as the interaction with peripheral components or devices.

The processor 1640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting conditional authorization of mobile nodes). For example, the device 1605 or a component of the device 1605 may include a processor 1640 and memory 1630 coupled to the processor 1640, the processor 1640 and memory 1630 configured to perform various functions described herein.

The inter-station communications manager 1645 may manage communications with other base stations 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communications network technology to provide communication between base stations 105.

The communications manager 1620 may support wireless communication at a core network entity in accordance with examples as disclosed herein. For example, the communications manager 1620 may be configured as or otherwise support a means for receiving, from a network entity, a first message including an indication of a capability of a wireless node to operate in an IAB mode by supporting communications with one or more child nodes of the wireless node. The communications manager 1620 may be configured as or otherwise support a means for determining whether to authorize the wireless node to operate in the IAB mode based on the capability of the wireless node and a mobility status of the wireless node, the mobility status associated with a location of the wireless node, a speed of the wireless node, or both. The communications manager 1620 may be configured as or otherwise support a means for transmitting a second message in response to the first message, the second message instructing the wireless node whether to operate in the IAB mode based on the determining.

By including or configuring the communications manager 1620 in accordance with examples as described herein, the device 1605 may support techniques for efficient connection with an IAB network, increased flexibility for mobile operations, reduced power consumption, more efficient utilization of communication resources, improved communication reliability, and improved coordination between devices.

In some examples, the communications manager 1620 may be configured to perform various operations (e.g., receiving, monitoring, transmitting) using or otherwise in cooperation with the transceiver 1615, the one or more antennas 1625, or any combination thereof. Although the communications manager 1620 is illustrated as a separate component, in some examples, one or more functions described with reference to the communications manager 1620 may be supported by or performed by the processor 1640, the memory 1630, the code 1635, or any combination thereof. For example, the code 1635 may include instructions executable by the processor 1640 to cause the device 1605 to perform various aspects of conditional authorization of mobile nodes as described herein, or the processor 1640 and the memory 1630 may be otherwise configured to perform or support such operations.

Figure 17:
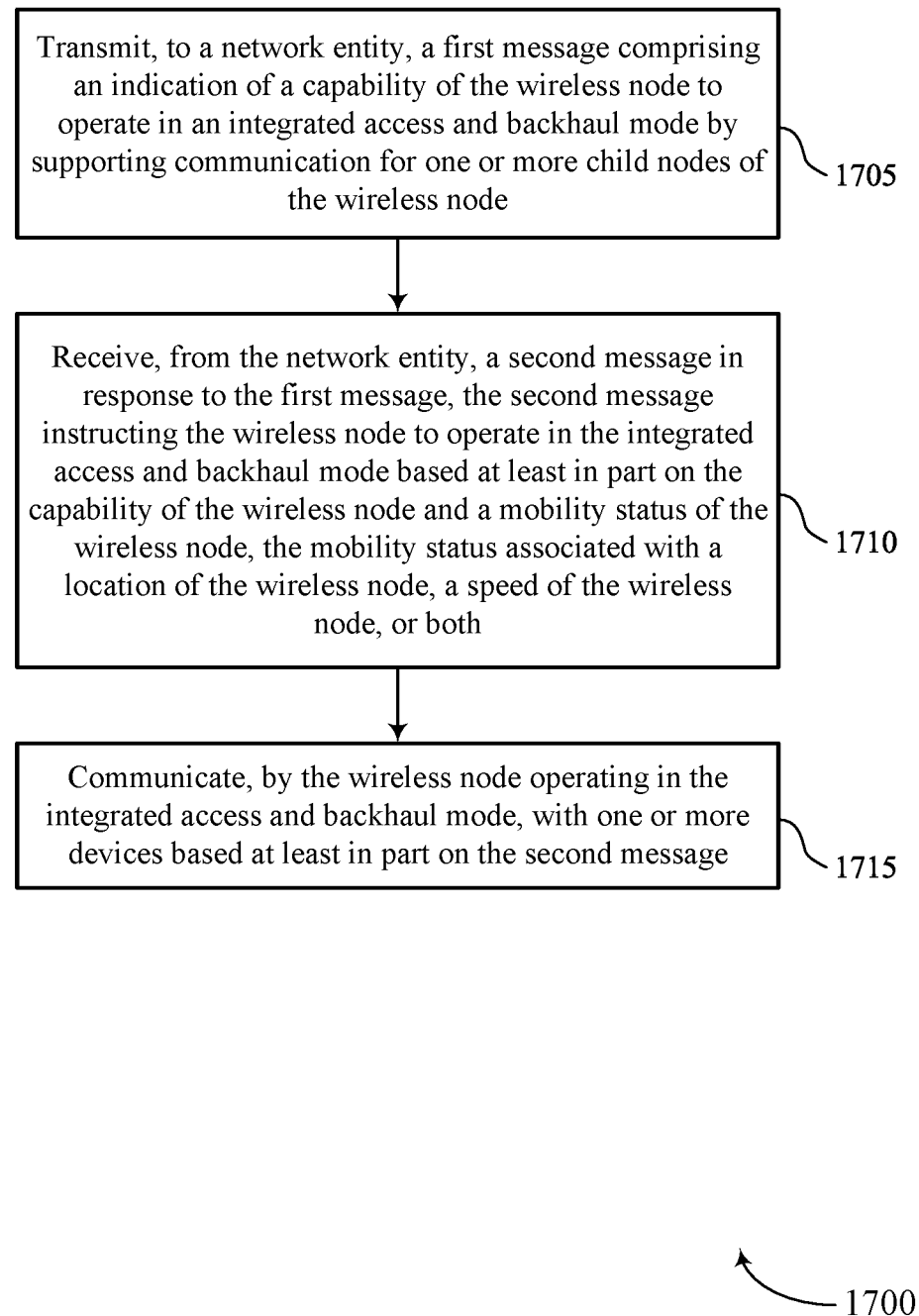
FIGS. 17 through 21 show flowcharts illustrating methods that support conditional authorization of mobile nodes in accordance with aspects of the present disclosure.

FIG. 17 shows a flowchart illustrating a method 1700 that supports conditional authorization of mobile nodes in accordance with aspects of the present disclosure. The operations of the method 1700 may be implemented by a UE or its components as described herein. For example, the operations of the method 1700 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1705, the method may include transmitting, to a network entity, a first message including an indication of a capability of the wireless node to operate in an IAB mode by supporting communication for one or more child nodes of the wireless node. The operations of 1705 may be performed in accordance with examples as disclosed herein. In some examples, aspects of the operations of 1705 may be performed by an IAB indication component 725 as described with reference to FIG. 7.

At 1710, the method may include receiving, from the network entity, a second message in response to the first message, the second message instructing the wireless node to operate in the IAB mode based on the capability of the wireless node and a mobility status of the wireless node, the mobility status associated with a location of the wireless node, a speed of the wireless node, or both. The operations of 1710 may be performed in accordance with examples as disclosed herein. In some examples, aspects of the operations of 1710 may be performed by an IAB instruction component 730 as described with reference to FIG. 7.

At 1715, the method may include communicating, by the wireless node operating in the IAB mode, with one or more devices based on the second message. The operations of 1715 may be performed in accordance with examples as disclosed herein. In some examples, aspects of the operations of 1715 may be performed by an operation component 735 as described with reference to FIG. 7.

Figure 18:
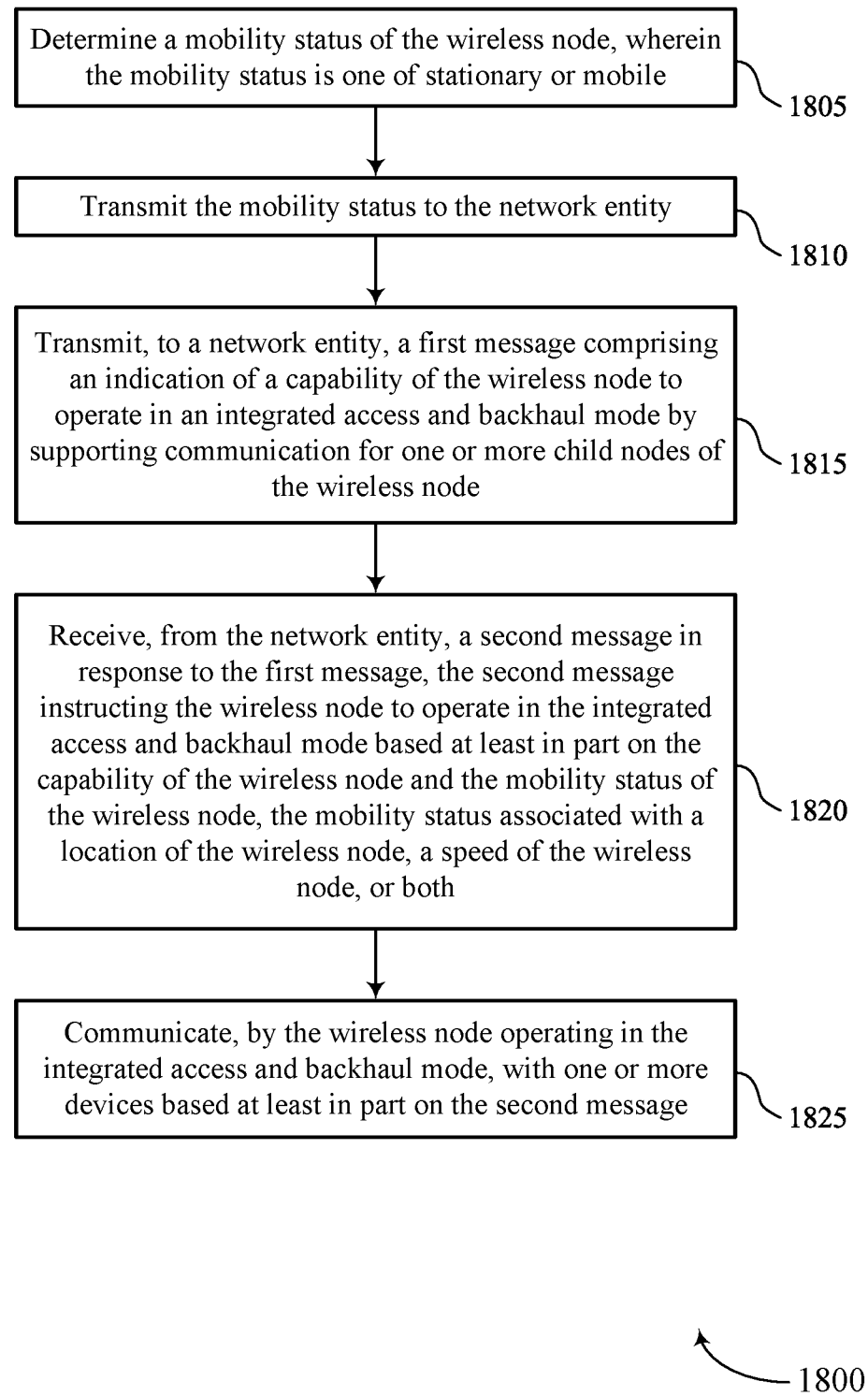

FIG. 18 shows a flowchart illustrating a method 1800 that supports conditional authorization of mobile nodes in accordance with aspects of the present disclosure. The operations of the method 1800 may be implemented by a UE or its components as described herein. For example, the operations of the method 1800 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1805, the method may include determining a mobility status of the wireless node, where the mobility status is one of stationary or mobile. The operations of 1805 may be performed in accordance with examples as disclosed herein. In some examples, aspects of the operations of 1805 may be performed by a mobility indication component 745 as described with reference to FIG. 7.

At 1810, the method may include transmitting the mobility status to the network entity. The operations of 1810 may be performed in accordance with examples as disclosed herein. In some examples, aspects of the operations of 1810 may be performed by a mobility status transmitting component 740 as described with reference to FIG. 7.

At 1815, the method may include transmitting, to a network entity, a first message including an indication of a capability of the wireless node to operate in an IAB mode by supporting communication for one or more child nodes of the wireless node. The operations of 1815 may be performed in accordance with examples as disclosed herein. In some examples, aspects of the operations of 1815 may be performed by an IAB indication component 725 as described with reference to FIG. 7.

At 1820, the method may include receiving, from the network entity, a second message in response to the first message, the second message instructing the wireless node to operate in the IAB mode based on the capability of the wireless node and the mobility status of the wireless node, the mobility status associated with a location of the wireless node, a speed of the wireless node, or both. The operations of 1820 may be performed in accordance with examples as disclosed herein. In some examples, aspects of the operations of 1820 may be performed by an IAB instruction component 730 as described with reference to FIG. 7.

At 1825, the method may include communicating, by the wireless node operating in the IAB mode, with one or more devices based on the second message. The operations of 1825 may be performed in accordance with examples as disclosed herein. In some examples, aspects of the operations of 1825 may be performed by an operation component 735 as described with reference to FIG. 7.

Figure 19:
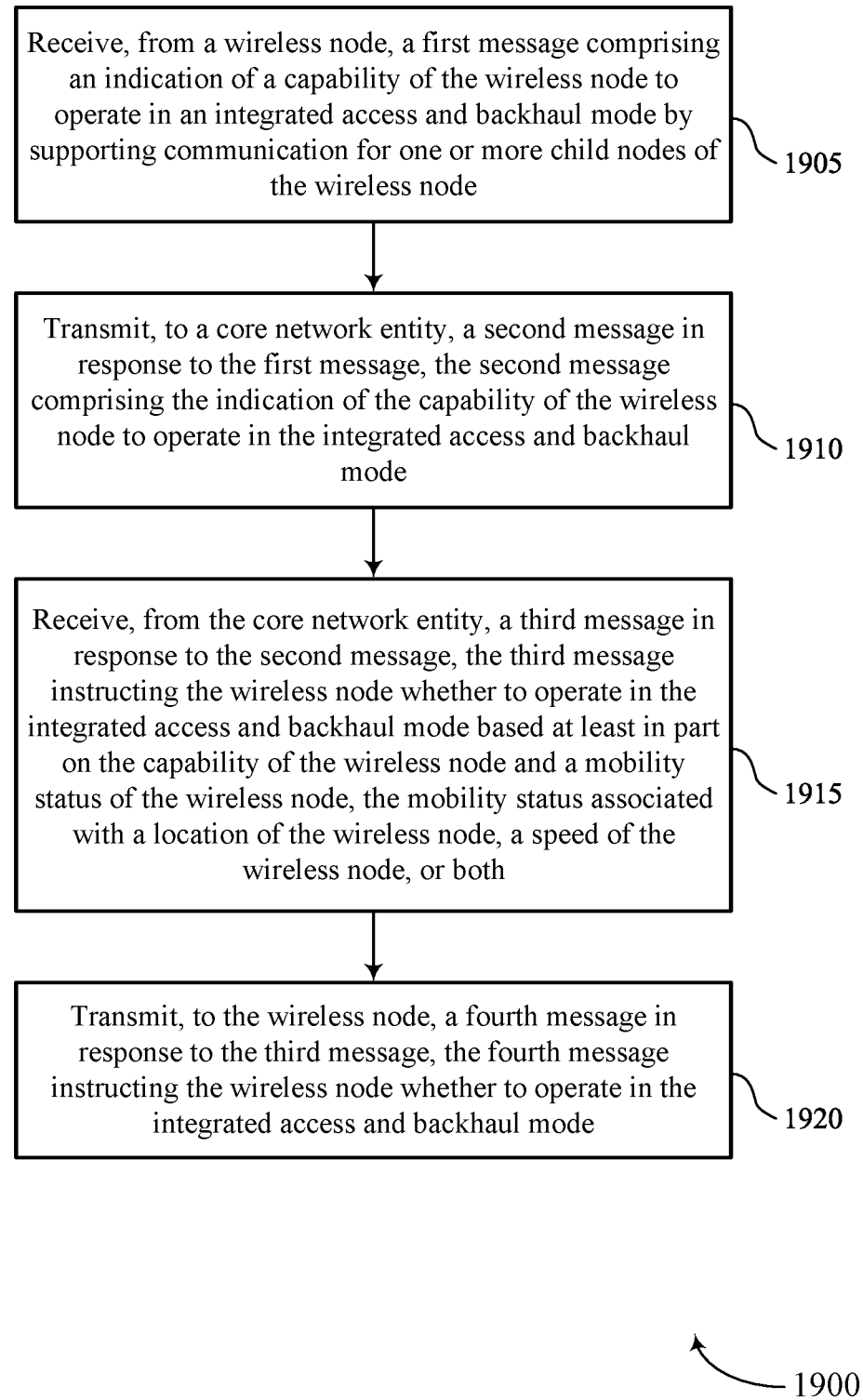

FIG. 19 shows a flowchart illustrating a method 1900 that supports conditional authorization of mobile nodes in accordance with aspects of the present disclosure. The operations of the method 1900 may be implemented by a base station or its components as described herein. For example, the operations of the method 1900 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1905, the method may include receiving, from a wireless node, a first message including an indication of a capability of the wireless node to operate in an IAB mode by supporting communication for one or more child nodes of the wireless node. The operations of 1905 may be performed in accordance with examples as disclosed herein. In some examples, aspects of the operations of 1905 may be performed by an IAB indication receiving component 1125 as described with reference to FIG. 11.

At 1910, the method may include transmitting, to a core network entity, a second message in response to the first message, the second message including the indication of the capability of the wireless node to operate in the IAB mode. The operations of 1910 may be performed in accordance with examples as disclosed herein. In some examples, aspects of the operations of 1910 may be performed by an IAB indication transmitting component 1130 as described with reference to FIG. 11.

At 1915, the method may include receiving, from the core network entity, a third message in response to the second message, the third message instructing the wireless node whether to operate in the IAB mode based on the capability of the wireless node and a mobility status of the wireless node, the mobility status associated with a location of the wireless node, a speed of the wireless node, or both. The operations of 1915 may be performed in accordance with examples as disclosed herein. In some examples, aspects of the operations of 1915 may be performed by an IAB instruction receiving component 1135 as described with reference to FIG. 11.

At 1920, the method may include transmitting, to the wireless node, a fourth message in response to the third message, the fourth message instructing the wireless node whether to operate in the IAB mode. The operations of 1920 may be performed in accordance with examples as disclosed herein. In some examples, aspects of the operations of 1920 may be performed by an IAB instruction transmitting component 1140 as described with reference to FIG. 11.

Figure 20:
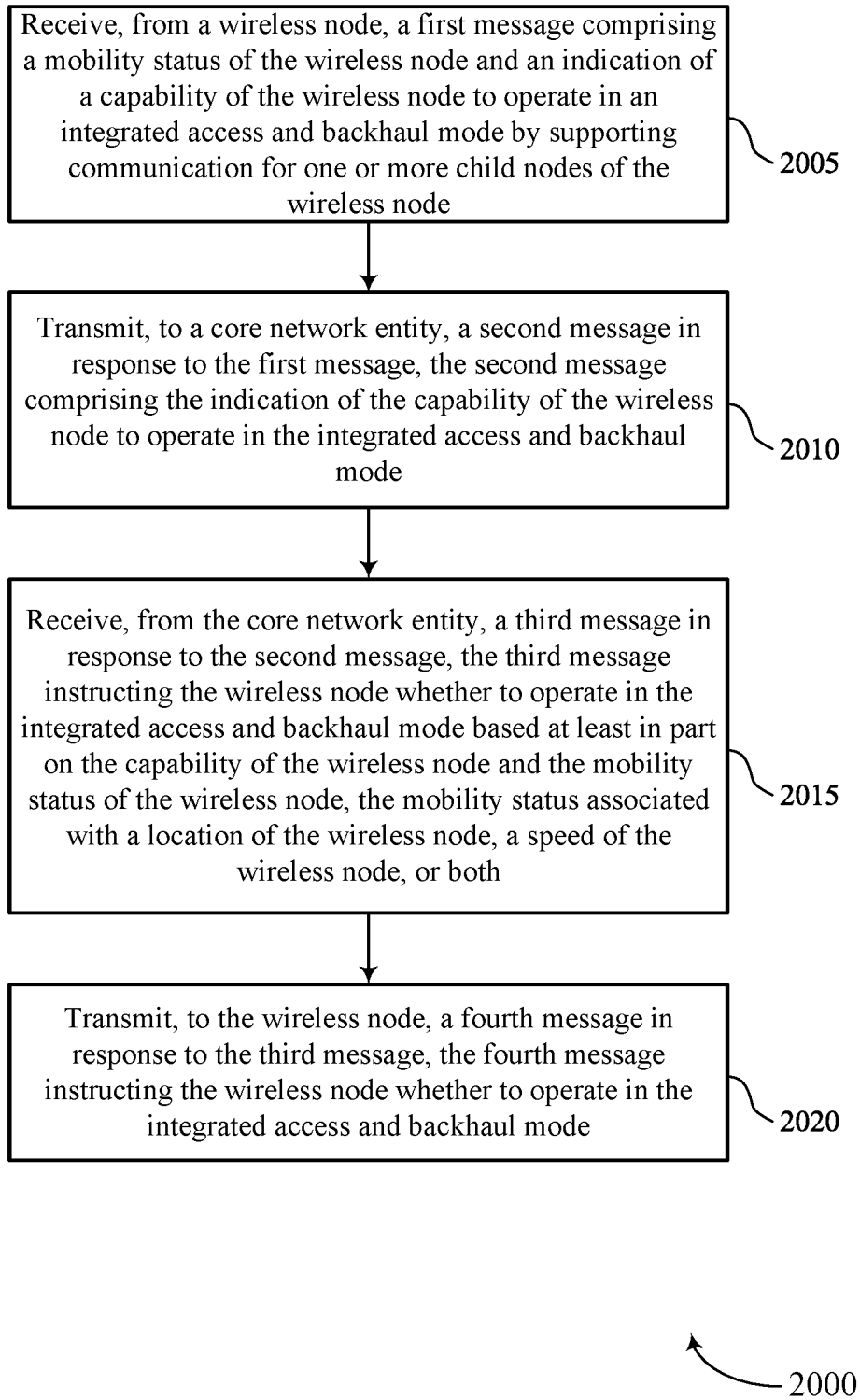

FIG. 20 shows a flowchart illustrating a method 2000 that supports conditional authorization of mobile nodes in accordance with aspects of the present disclosure. The operations of the method 2000 may be implemented by a base station or its components as described herein. For example, the operations of the method 2000 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 2005, the method may include receiving, from a wireless node, a first message including a mobility status of the wireless node and an indication of a capability of the wireless node to operate in an IAB mode by supporting communication for one or more child nodes of the wireless node. The operations of 2005 may be performed in accordance with examples as disclosed herein. In some examples, aspects of the operations of 2005 may be performed by an IAB indication receiving component 1125 as described with reference to FIG. 11.

At 2010, the method may include transmitting, to a core network entity, a second message in response to the first message, the second message including the indication of the capability of the wireless node to operate in the IAB mode. The operations of 2010 may be performed in accordance with examples as disclosed herein. In some examples, aspects of the operations of 2010 may be performed by an IAB indication transmitting component 1130 as described with reference to FIG. 11.

At 2015, the method may include receiving, from the core network entity, a third message in response to the second message, the third message instructing the wireless node whether to operate in the IAB mode based on the capability of the wireless node and the mobility status of the wireless node, the mobility status associated with a location of the wireless node, a speed of the wireless node, or both. The operations of 2015 may be performed in accordance with examples as disclosed herein. In some examples, aspects of the operations of 2015 may be performed by an IAB instruction receiving component 1135 as described with reference to FIG. 11.

At 2020, the method may include transmitting, to the wireless node, a fourth message in response to the third message, the fourth message instructing the wireless node whether to operate in the IAB mode. The operations of 2020 may be performed in accordance with examples as disclosed herein. In some examples, aspects of the operations of 2020 may be performed by an IAB instruction transmitting component 1140 as described with reference to FIG. 11.

Figure 21:
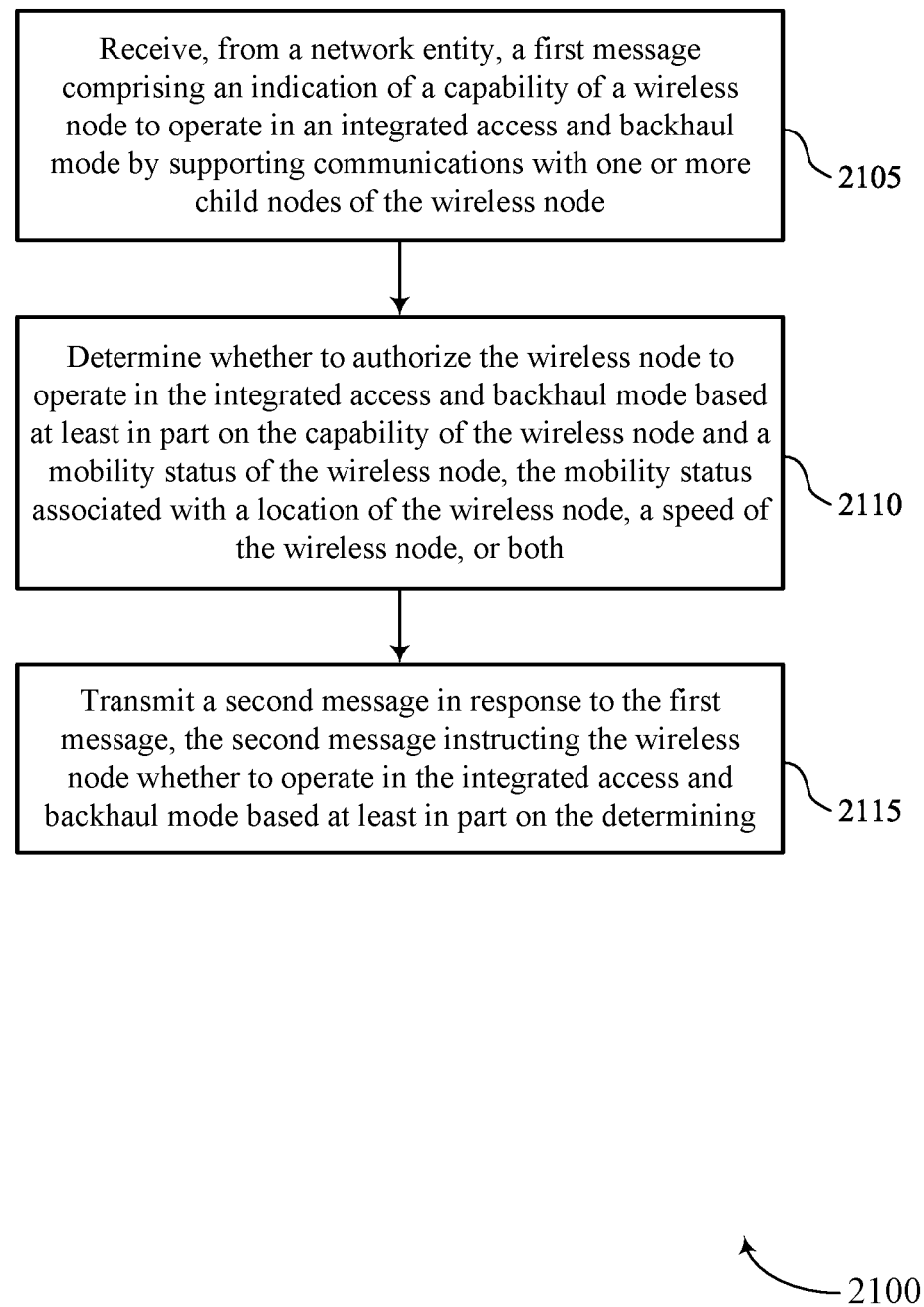

FIG. 21 shows a flowchart illustrating a method 2100 that supports conditional authorization of mobile nodes in accordance with aspects of the present disclosure. The operations of the method 2100 may be implemented by a base station 105 or its components as described herein. For example, the operations of the method 2100 may be performed by a base station 105 as described with reference to FIGS. 1 through 4 and 13 through 16. In some examples, a base station 105 may execute a set of instructions to control the functional elements of the base station 105 to perform the described functions. Additionally or alternatively, the base station 105 may perform aspects of the described functions using special-purpose hardware.

At 2105, the method may include receiving, from a network entity, a first message including an indication of a capability of a wireless node to operate in an IAB mode by supporting communications with one or more child nodes of the wireless node. The operations of 2105 may be performed in accordance with examples as disclosed herein. In some examples, aspects of the operations of 2105 may be performed by an IAB indication component 1525 as described with reference to FIG. 15.

At 2110, the method may include determining whether to authorize the wireless node to operate in the IAB mode based on the capability of the wireless node and a mobility status of the wireless node, the mobility status associated with a location of the wireless node, a speed of the wireless node, or both. The operations of 2110 may be performed in accordance with examples as disclosed herein. In some examples, aspects of the operations of 2110 may be performed by an authorization component 1530 as described with reference to FIG. 15.

At 2115, the method may include transmitting a second message in response to the first message, the second message instructing the wireless node whether to operate in the IAB mode based on the determining. The operations of 2115 may be performed in accordance with examples as disclosed herein. In some examples, aspects of the operations of 2115 may be performed by an IAB instruction component 1535 as described with reference to FIG. 15.

The following provides an overview of aspects of the present disclosure:

Aspect 1: A method for wireless communication at a wireless node, comprising: transmitting, to a network entity, a first message comprising an indication of a capability of the wireless node to operate in an IAB mode by supporting communication for one or more child nodes of the wireless node; receiving, from the network entity, a second message in response to the first message, the second message instructing the wireless node to operate in the IAB mode based at least in part on the capability of the wireless node and a mobility status of the wireless node, the mobility status associated with a location of the wireless node, a speed of the wireless node, or both; and communicating, by the wireless node operating in the IAB mode, with one or more devices based at least in part on the second message.

Aspect 2: The method of aspect 1, further comprising: transmitting, to the network entity, a third message indicating the mobility status of the wireless node based at least in part on the capability of the wireless node to operate in the IAB mode.

Aspect 3: The method of any of aspects 1 through 2, wherein transmitting the first message comprises: transmitting the mobility status of the wireless node to the network entity in the first message.

Aspect 4: The method of any of aspects 1 through 3, further comprising: determining the mobility status of the wireless node, wherein the mobility status is one of stationary or mobile; and transmitting the mobility status to the network entity.

Aspect 5: The method of any of aspects 1 through 4, further comprising: transmitting the mobility status to the network entity, wherein the mobility status is based at least in part on the speed of the wireless node relative to a speed threshold.

Aspect 6: The method of aspect 5, further comprising: receiving an indication of the speed threshold from the network entity.

Aspect 7: The method of any of aspects 5 through 6, wherein the mobility status indicates the speed of the wireless node relative to the speed threshold.

Aspect 8: The method of any of aspects 1 through 7, further comprising: transmitting a broadcast message indicating the wireless node operating in the IAB mode based at least in part on the second message, wherein the broadcast message comprises a SIB.

Aspect 9: The method of any of aspects 1 through 8, wherein receiving the second message comprises: receiving an indication of an area for the wireless node to operate in the IAB mode in the second message.

Aspect 10: The method of aspect 9, wherein communicating with the one or more devices comprises: communicating, by the wireless node operating in the IAB mode, with the one or more devices in the area for the wireless node to operate in the IAB mode.

Aspect 11: The method of aspect 10, wherein the area comprises a cell, a radio access network based notification area code, a tracking area, a portion of a cell, a geographical area, or any combination thereof.

Aspect 12: The method of any of aspects 1 through 11, wherein communicating with the one or more devices comprises: communicating, by the wireless node operating in the IAB mode, with a child wireless node of the wireless node.

Aspect 13: The method of any of aspects 1 through 12, wherein operating in the IAB mode is based at least in part on an F1 connection associated with the wireless node.

Aspect 14: The method of any of aspects 1 through 13, wherein the first message, the second message, or both are communicated using one of a non-access stratum, a RRC message, a network interface, or any combination thereof.

Aspect 15: A method for wireless communication at a network entity, comprising: receiving, from a wireless node, a first message comprising an indication of a capability of the wireless node to operate in an IAB mode by supporting communication for one or more child nodes of the wireless node; transmitting, to a core network entity, a second message in response to the first message, the second message comprising the indication of the capability of the wireless node to operate in the IAB mode; receiving, from the core network entity, a third message in response to the second message, the third message instructing the wireless node whether to operate in the IAB mode based at least in part on the capability of the wireless node and a mobility status of the wireless node, the mobility status associated with a location of the wireless node, a speed of the wireless node, or both; and transmitting, to the wireless node, a fourth message in response to the third message, the fourth message instructing the wireless node whether to operate in the IAB mode.

Aspect 16: The method of aspect 15, further comprising: communicating with a child wireless node of the wireless node based at least in part on instructing the wireless node to operate in the IAB mode.

Aspect 17: The method of any of aspects 15 through 16, further comprising: receiving, from the wireless node, a fifth message indicating the mobility status of the wireless node based at least in part on the capability of the wireless node to operate in the IAB mode.

Aspect 18: The method of any of aspects 15 through 17, wherein receiving the first message comprises: receiving the mobility status of the wireless node from the wireless node in the first message.

Aspect 19: The method of any of aspects 15 through 18, wherein transmitting the fourth message comprises: transmitting the fourth message to a second wireless node based at least in part on a handover procedure and the third message, the fourth message instructing the second wireless node to communicate with a child wireless node of the wireless node.

Aspect 20: The method of any of aspects 15 through 19, further comprising: transmitting, to the wireless node, a fifth message in response to the third message, the fifth message associated with a network interface connection.

Aspect 21: The method of any of aspects 15 through 20, further comprising: transmitting a fifth message in response to the third message, the fifth message associated with activation of one or more cells of the wireless node.

Aspect 22: The method of any of aspects 15 through 21, further comprising: transmitting a fifth message in response to the third message, the fifth message associated with configuring resources of the wireless node.

Aspect 23: A method for wireless communication at a core network entity, comprising: receiving, from a network entity, a first message comprising an indication of a capability of a wireless node to operate in an IAB mode by supporting communications with one or more child nodes of the wireless node; determining whether to authorize the wireless node to operate in the IAB mode based at least in part on the capability of the wireless node and a mobility status of the wireless node, the mobility status associated with a location of the wireless node, a speed of the wireless node, or both; and transmitting a second message in response to the first message, the second message instructing the wireless node whether to operate in the IAB mode based at least in part on the determining.

Aspect 24: The method of aspect 23, further comprising: receiving, from the network entity, a third message indicating the mobility status of the wireless node based at least in part on the capability of the wireless node to operate in the IAB mode.

Aspect 25: The method of any of aspects 23 through 24, wherein receiving the first message comprises: receiving the mobility status of the wireless node from the network entity in the first message.

Aspect 26: The method of any of aspects 23 through 25, wherein transmitting the second message comprises transmitting the second message to the wireless node, the network entity, or both.

Aspect 27: An apparatus for wireless communication at a wireless node, comprising a memory; and a processor coupled to the memory and configured to perform a method of any of aspects 1 through 14.

Aspect 28: An apparatus for wireless communication at a wireless node, comprising at least one means for performing a method of any of aspects 1 through 14.

Aspect 29: A non-transitory computer-readable medium storing code for wireless communication at a wireless node, the code comprising instructions executable by a processor to perform a method of any of aspects 1 through 14.

Aspect 30: An apparatus for wireless communication at a network entity, comprising a memory; and a processor coupled to the memory and configured to perform a method of any of aspects 15 through 22.

Aspect 31: An apparatus for wireless communication at a network entity, comprising at least one means for performing a method of any of aspects 15 through 22.

Aspect 32: A non-transitory computer-readable medium storing code for wireless communication at a network entity, the code comprising instructions executable by a processor to perform a method of any of aspects 15 through 22.

Aspect 33: An apparatus for wireless communication at a core network entity, comprising a memory; and a processor coupled to the memory and configured to perform a method of any of aspects 23 through 26.

Aspect 34: An apparatus for wireless communication at a core network entity, comprising at least one means for performing a method of any of aspects 23 through 26.

Aspect 35: A non-transitory computer-readable medium storing code for wireless communication at a core network entity, the code comprising instructions executable by a processor to perform a method of any of aspects 23 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A wireless node for wireless communication, comprising:
    one or more memories storing processor-executable code; and
    one or more processors coupled with the one or more memories and individually or collectively operable to execute the code to cause the wireless node to:
        transmit, to a network entity, a first message comprising an indication of a capability of the wireless node to operate in an integrated access and backhaul mode by supporting communication for one or more child nodes of the wireless node;
        transmit, to the network entity, a third message indicating a mobility status of the wireless node based at least in part on the capability of the wireless node to operate in the integrated access and backhaul mode;
        receive, from the network entity, a second message instructing the wireless node to operate in the integrated access and backhaul mode based at least in part on the capability of the wireless node and the mobility status of the wireless node, the mobility status associated with a location of the wireless node, a speed of the wireless node, or both; and
        communicate, by the wireless node operating in the integrated access and backhaul mode, with one or more devices based at least in part on the second message.

2. The wireless node of claim 1, wherein the one or more processors are individually or collectively operable to execute the code to cause the wireless node to:
    determine the mobility status of the wireless node, wherein the mobility status is one of stationary or mobile.

3. The wireless node of claim 1, wherein the mobility status is based at least in part on the speed of the wireless node relative to a speed threshold.

4. The wireless node of claim 3, wherein the one or more processors are individually or collectively operable to execute the code to cause the wireless node to:
    receive an indication of the speed threshold from the network entity.

5. The wireless node of claim 3, wherein the mobility status indicates the speed of the wireless node relative to the speed threshold.

6. The wireless node of claim 1, wherein the one or more processors are individually or collectively operable to execute the code to cause the wireless node to:
    transmit a broadcast message indicating the wireless node operating in the integrated access and backhaul mode based at least in part on the second message, wherein the broadcast message comprises a system information block.

7. The wireless node of claim 1, wherein, to receive the second message, the one or more processors are individually or collectively operable to execute the code to cause the wireless node to:
    receive an indication of an area for the wireless node to operate in the integrated access and backhaul mode in the second message.

8. The wireless node of claim 7, wherein, to communicate with the one or more devices, the one or more processors are individually or collectively operable to execute the code to cause the wireless node to:
    communicate, by the wireless node operating in the integrated access and backhaul mode, with the one or more devices in the area for the wireless node to operate in the integrated access and backhaul mode.

9. The wireless node of claim 8, wherein the area comprises a cell, a radio access network based notification area code, a tracking area, a portion of a cell, a geographical area, or any combination thereof.

10. The wireless node of claim 1, wherein the one or more processors are individually or collectively operable to execute the code to cause the wireless node to:
    communicate, by the wireless node operating in the integrated access and backhaul mode, with a child wireless node of the wireless node.

11. The wireless node of claim 1, wherein operating in the integrated access and backhaul mode is based at least in part on an F1 connection associated with the wireless node.

12. The wireless node of claim 1, wherein the first message, the second message, or both are communicated using one of a non-access stratum, a radio resource control message, a network interface, or any combination thereof.

13. A network entity for wireless communication, comprising:

one or more memories storing processor-executable code; and one or more processors coupled with the one or more memories and individually or collectively operable to execute the code to cause the network entity to:

receive, from a wireless node, a first message comprising an indication of a capability of the wireless node to operate in an integrated access and backhaul mode by supporting communication for one or more child nodes of the wireless node;

transmit, to a core network entity, a second message in response to the first message, the second message comprising the indication of the capability of the wireless node to operate in the integrated access and backhaul mode;

receive, from the core network entity, a third message in response to the second message, the third message instructing the wireless node whether to operate in the integrated access and backhaul mode based at least in part on the capability of the wireless node and a mobility status of the wireless node, the mobility status associated with a location of the wireless node, a speed of the wireless node, or both; and transmit, to the wireless node, a fourth message in response to the third message, the fourth message instructing the wireless node whether to operate in the integrated access and backhaul mode.

14. The network entity of claim 13, wherein the one or more processors are individually or collectively operable to execute the code to cause the network entity to:

communicate with a child wireless node of the wireless node based at least in part on instructing the wireless node to operate in the integrated access and backhaul mode.

15. The network entity of claim 13, wherein the one or more processors are individually or collectively operable to execute the code to cause the network entity to:

receive, from the wireless node, a fifth message indicating the mobility status of the wireless node based at least in part on the capability of the wireless node to operate in the integrated access and backhaul mode.

16. The network entity of claim 13, wherein, to receive the first message, the one or more processors are individually or collectively operable to execute the code to cause the network entity to:

receive the mobility status of the wireless node from the wireless node in the first message.

17. The network entity of claim 13, wherein, to transmit the fourth message, the one or more processors are individually or collectively operable to execute the code to cause the network entity to:

transmit the fourth message to a second wireless node based at least in part on a handover procedure and the third message, the fourth message instructing the second wireless node to communicate with a child wireless node of the wireless node.

18. The network entity of claim 13, wherein the one or more processors are individually or collectively operable to execute the code to cause the network entity to:

transmit, to the wireless node, a fifth message in response to the third message, the fifth message associated with a network interface connection.

19. The network entity of claim 13, wherein the one or more processors are individually or collectively operable to execute the code to cause the network entity to:

transmit a fifth message in response to the third message, the fifth message associated with activation of one or more cells of the wireless node.

20. The network entity of claim 13, wherein the one or more processors are individually or collectively operable to execute the code to cause the network entity to:

transmit a fifth message in response to the third message, the fifth message associated with configuring resources of the wireless node.

21. A core network entity for wireless communication, comprising:

one or more memories storing processor-executable code; and one or more processors coupled with the one or more memories and individually or collectively operable to execute the code to cause the core network entity to:

receive, from a network entity, a first message comprising an indication of a capability of a wireless node to operate in an integrated access and backhaul mode by supporting communications with one or more child nodes of the wireless node;

determine whether to authorize the wireless node to operate in the integrated access and backhaul mode based at least in part on the capability of the wireless node and a mobility status of the wireless node, the mobility status associated with a location of the wireless node, a speed of the wireless node, or both; and transmit a second message in response to the first message, the second message instructing the wireless node whether to operate in the integrated access and backhaul mode based at least in part on the determining.

22. The core network entity of claim 21, wherein the one or more processors are individually or collectively operable to execute the code to cause the core network entity to:

receive, from the network entity, a third message indicating the mobility status of the wireless node based at least in part on the capability of the wireless node to operate in the integrated access and backhaul mode.

23. The core network entity of claim 21, wherein, to receive the first message, the one or more processors are individually or collectively operable to execute the code to cause the core network entity to:

receive the mobility status of the wireless node from the network entity in the first message.

24. The core network entity of claim 21, wherein transmitting the second message comprises transmitting the second message to the wireless node, the network entity, or both.

25. A method for wireless communication at a wireless node, comprising:

transmitting, to a network entity, a first message comprising an indication of a capability of the wireless node to operate in an integrated access and backhaul mode by supporting communication for one or more child nodes of the wireless node;

transmitting, to the network entity, a third message indicating a mobility status of the wireless node based at least in part on the capability of the wireless node to operate in the integrated access and backhaul mode;

receiving, from the network entity, a second message instructing the wireless node to operate in the integrated access and backhaul mode based at least in part on the capability of the wireless node and the mobility status of the wireless node, the mobility status associated with a location of the wireless node, a speed of the wireless node, or both; and communicating, by the wireless node operating in the integrated access and backhaul mode, with one or more devices based at least in part on the second message.

26. The method of claim 25, further comprising:

determining the mobility status of the wireless node, wherein the mobility status is one of stationary or mobile; and transmitting the mobility status to the network entity.

* * * * *